(12) United States Patent
Barton

(10) Patent No.: US 7,708,161 B2
(45) Date of Patent: May 4, 2010

(54) LIGHT-WEIGHT VACUUM CHAMBER AND APPLICATIONS THEREOF

(75) Inventor: Sean Anderson Barton, Quincy, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 669 days.

(21) Appl. No.: 11/633,928

(22) Filed: Dec. 5, 2006

(65) Prior Publication Data

US 2008/0128434 A1     Jun. 5, 2008

(51) Int. Cl.
B65D 6/28      (2006.01)
B65D 8/04      (2006.01)
B65D 25/04     (2006.01)
B65D 85/00     (2006.01)

(52) U.S. Cl. ................. 220/507; 220/62.11; 220/62.18; 220/564; 220/626

(58) Field of Classification Search ................ 220/4.04, 220/4.12, 23.2, 23.8, 23.83, 62.11, 62.18, 220/507, 553, 564, 565, 581, 584, 585, 592.26, 220/626

See application file for complete search history.

(56) References Cited

U.S. PATENT DOCUMENTS

| | | | | |
|---|---|---|---|---|
| 1,645,944 A | * | 10/1927 | Debor | 220/581 |
| 2,457,118 A | * | 12/1948 | Boardman | 220/565 |
| 2,792,962 A | * | 5/1957 | Granfelt | 220/507 |
| 3,645,415 A | * | 2/1972 | Phelps | 220/565 |
| 4,946,056 A | * | 8/1990 | Stannard | 220/584 |
| 5,564,587 A | * | 10/1996 | Falk et al. | 220/501 |
| 5,787,920 A | * | 8/1998 | Krasnov | 137/255 |
| 5,944,215 A | * | 8/1999 | Orlowski | 220/501 |
| 6,095,367 A | * | 8/2000 | Blair et al. | 220/581 |

* cited by examiner

Primary Examiner—Anthony Stashick
Assistant Examiner—Madison L Wright
(74) Attorney, Agent, or Firm—J. Wiley Horton

(57) ABSTRACT

A vacuum chamber with an innovative wall structure. Instead of a conventional homogenous wall structure, the invention uses an array of internally-pressurized, thin-walled cells to contain an enclosed volume. The walls are arranged so that when a vacuum is present in the enclosed volume, the cell walls are placed primarily in tension. In this way the likelihood of buckling instability is substantially reduced. The result is a much lighter vessel compared to a conventional homogenous wall vessel of similar strength.

18 Claims, 33 Drawing Sheets

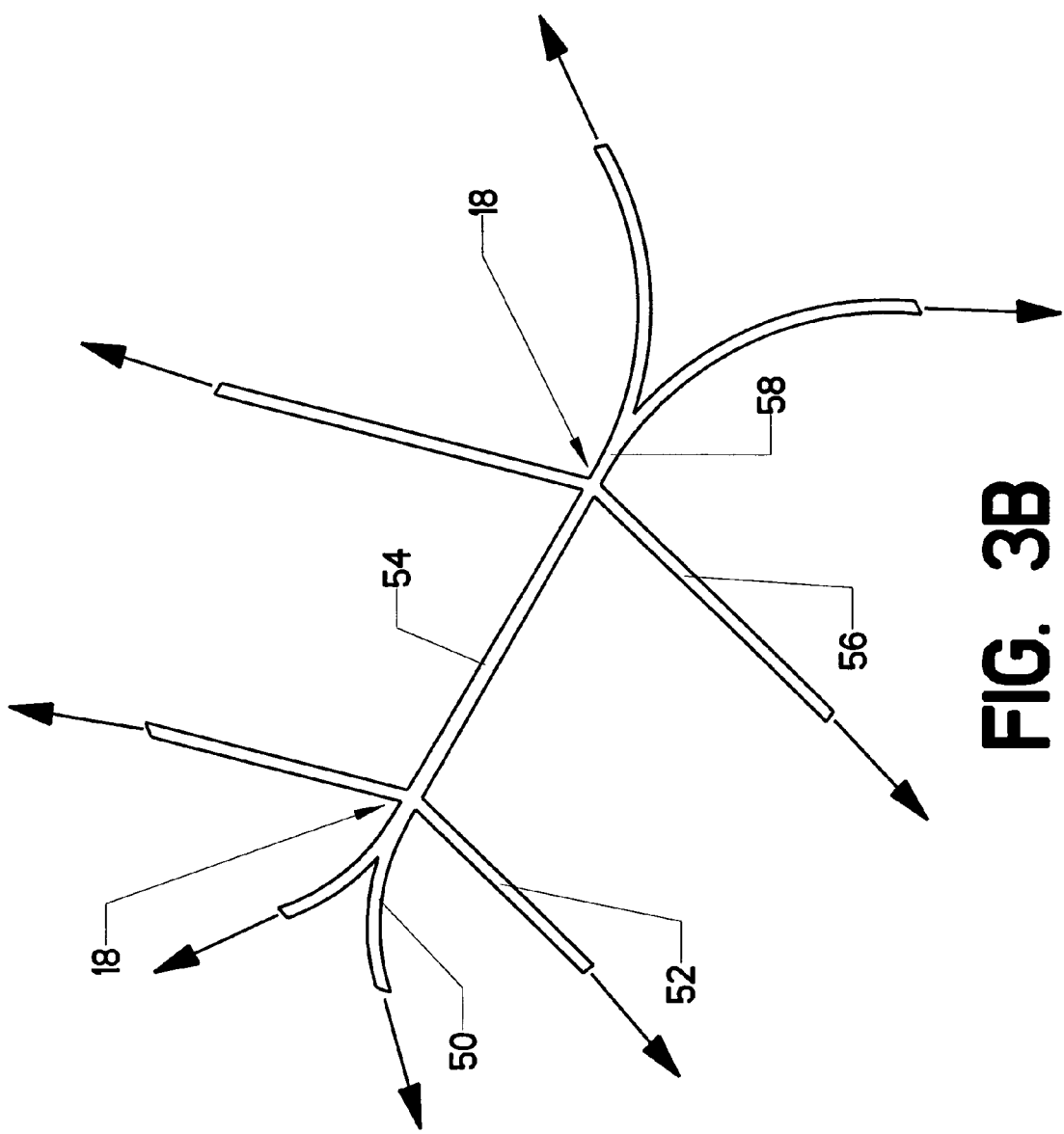

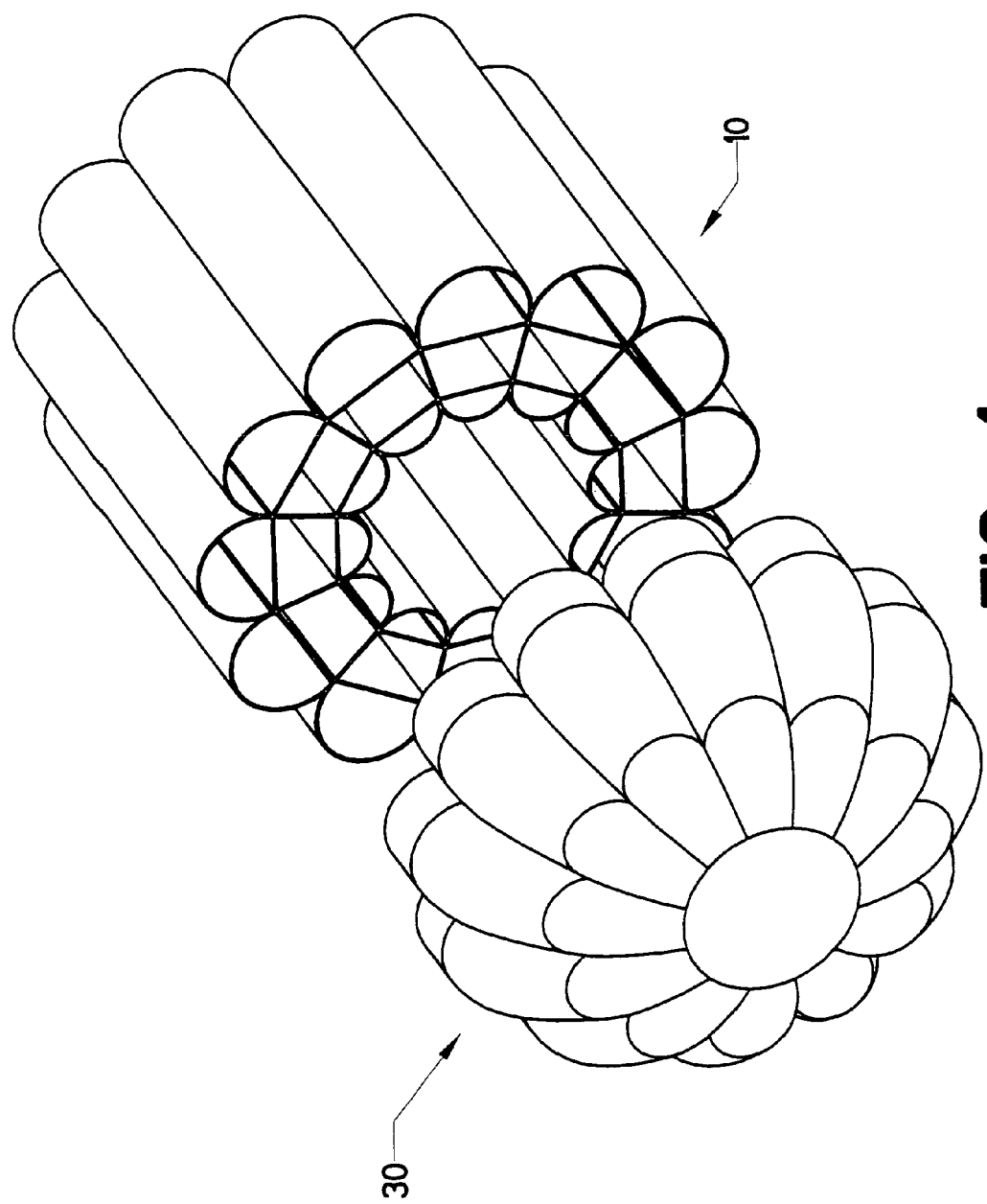

LIGHT-WEIGHT VACUUM CHAMBER AND APPLICATIONS THEREOF

BACKGROUND OF THE INVENTION

1. Field of the Invention

This invention relates to the field of vacuum chambers. More specifically, the invention comprises a novel construction for a vacuum chamber in which the wall members are subjected primarily to tensile forces. Applications for the vacuum chamber are also disclosed.

2. Description of the Related Art

Vacuum chambers have been in existence for many years. They generally have thick and strong walls, so that they can resist the compressive forces exerted by the surrounding atmosphere. The walls must resist simple compressive forces (hoop and axial forces), and must generally be thick enough to prevent buckling. Those skilled in the art will know that buckling instability typically defines the failure limit of a vacuum chamber.

Traditional designs have been quite heavy. For earth-bound vacuum chambers, weight is frequently not a concern. However, for mobile chambers, weight can be a very significant concern. The weight associated with traditional vacuum chambers can be highly significant in such an environment.

A very light-weight vacuum chamber raises the possibility of displacing a greater weight of atmosphere than the weight of the vacuum chamber itself. Such a design could achieve positive buoyance, creating a rigid "vacuum balloon." There are numerous applications for such a device, some of which will be disclosed subsequently. The reader will appreciate at this point, however, that a very light-weight vacuum chamber has significant advantages over a traditional vacuum chamber.

The walls of traditional vacuum chambers have experienced primarily compressive forces. Such a chamber typically fails well before the ultimate compressive limit of the material used, since the chamber fails by buckling. Compressive forces tend to produce an inherently unstable situation. The walls must be thick enough to provide anti-buckling stability.

In determining the chamber's required strength, two failure modes must be considered—yield failure and deformation (buckle) failure. The mathematics of yield failure is simpler and will considered first.

A simple analysis for a conventional thin-walled vacuum chamber (having a homogenous wall, unlike the present invention) is helpful. By taking a section that cuts the cylinder into two semi-cylinders, the minimum required wall thickness (t) (neglecting safety factors) to overcome yield failure can be computed using the cylinder's radius (R), the yield strength of the material used (Y), and the external pressure (P). In order to prevent yield failure, the following must be true:

$$tY > RP$$

Given that the thickness to radius ratio is size invariant, one can simplify the expression by setting the radius equal to unity, and thus consider all other linear dimensions to be fractions of the chamber's radius. Thus, a simpler expression for the required wall thickness becomes:

$$t > \frac{P}{Y} \quad \text{(Equation 1)}$$

In order to achieve positive buoyancy, the mass of the chamber must be less than the mass of the air displaced. If $\rho$ is the density of the chamber material, then the following equation must be satisfied:

$$2\pi R t \rho < \pi R^2 \rho_{air}$$

If the radius is again set to unity, and the thickness expressed as a fraction thereof, then a simplified expression for the maximum wall thickness allowable while still achieving buoyancy can be written as:

$$t < \frac{1}{2} \frac{\rho_{air}}{\rho} \quad \text{(Equation 2)}$$

Substituting Equation 2 into Equation 1 gives the following expression:

$$\frac{Y}{\rho} \cdot \frac{\rho_{air}}{P} > 2$$

The left term on the left side of this equation is a function of the material selected. The right term on the left side of this equation depends on the properties of the air. The reader should note that this term is temperature dependent but not pressure dependent (at a fixed temperature). One can compute a "critical temperature" for each material indicating the temperature above which there is no theoretical hope of constructing a positively buoyant vacuum chamber (since the air density will be so low above that temperature that the mass displaced by the vacuum chamber will be lighter than the chamber itself). The following table presents the strength to density ratios and critical temperatures for several available materials, in units of air pressure and density, respectively:

TABLE I

| Material | Yield strength (ksi) | Density (g/cm³) | ratio (@15° C.) | $T_{critical}$ (° C.) |
|---|---|---|---|---|
| 2014-T6 Aluminum | 60 | 2.79 | 1.79 | −15 |
| 304 Stainless Steel | 80 | 8.03 | 0.82 | −215 |
| Am 1004-T61 Magnesium | 22 | 1.83 | 1.00 | −129 |
| Ti—6Al—4V Titanium | 134 | 4.43 | 2.52 | 90 |
| Kevlar 49 FRP | 47 | 1.45 | 2.68 | 113 |
| Carbon fiber composite | 250 | 1.62 | 12.86 | 1580 |

Thus, if one only analyses the yield failure, then one must simply choose a material from TABLE I, make sure that the ambient temperature is below the critical temperature listed, and then choose an appropriate wall thickness based on the prior equations.

As an example, the following thicknesses would be appropriate for a chamber having a radius of one meter at standard sea-level conditions:

TABLE II

| Material | Thickness (mm) |
|---|---|
| Ti-6Al-4V Titanium | 0.11–0.14 |
| Kevlar 49 FRP | 0.31–0.42 |
| Carbon fiber composite | 0.06–0.38 |

Of course, one must also consider deformation failure (buckling). To confirm that a structure will not deform to collapse the volume of vacuum, one must confirm that the potential energy increase associated with deforming the chamber (the deformation energy) is greater that the potential energy decrease associated with the corresponding reduction in the volume of vacuum (the vacuum energy). Those skilled in the art will know that this is an "energy balance" approach to stability analysis.

Either by theoretical analysis or experiment, it can be shown that the mode of deformation having the largest vacuum energy to deformation energy ratio is the "n=2" or "circle to ellipse" mode of deformation. FIG. 15 graphically depicts this mode. The circular section (dashed) is the undeformed state, while the elliptical section is the deformed state. The deformation parameter d gives the displacement of the unit-radius cylinder wall along the major and minor axes of the elliptical deformation.

The vacuum energy in this deformation mode can be calculated as:

$$P\Delta V = -\frac{3}{2}d^2\pi P$$

The deformation energy can be calculated as:

$$+\frac{3}{8}t^3 d^2 E\pi$$

In this expression, E is the material's modulus of elasticity. In order that the sum of the deformation and vacuum energies be greater than zero (noting the sign change in the two expressions above), the following must be true:

$$t > \left[\frac{4P}{E}\right]^{\frac{1}{3}}$$

The required thicknesses can then be computed. These are presented in the table below:

TABLE III

| Material | Modulus of Elasticity (ksi) | Min. Wall Thickness (mm), for a 1 m radius chamber |
| --- | --- | --- |
| 2014-T6 Aluminum | 10,600 | 17.7 |
| 304 Stainless Steel | 28,000 | 12.8 |
| Am 1004-T61 Magnesium | 6,480 | 20.9 |
| Ti-6Al-4V Titanium | 17,400 | 15.0 |
| Kevlar 49 FRP | 12,666 | 16.7 |
| Carbon fiber composite | 16,666 | 15.2 |

Comparing TABLE III to TABLE II, the reader will note that the wall thickness required for buckling stability is far greater than the maximum wall thickness allowed for positive buoyancy. Thus, one can conclude that it is not possible to construct a positively buoyant vacuum chamber using a conventional thin-walled cylinder (at least using any materials presently known).

In order for the thin-walled cylinder to achieve positive buoyancy, one must somehow bring together the minimum thickness required for stability and the maximum thickness allowed for weight concerns. Assuming a standard temperature (15 degrees Celsius) and specifying that the two requirements be compatible, one can write the following equation:

$$\left(\frac{4P}{E}\right)^{\frac{1}{3}} \leq \frac{1}{2}\frac{\rho_{air}}{\rho}$$

The air density is of course related to the pressure. One actually discovers that at a certain pressure, the equation can be satisfied. The following table provides this critical "buoyancy pressure" for several materials:

TABLE IV

| Material | Buoyancy Pressure (atm) |
| --- | --- |
| Ti-6Al-4V Titanium | 1131 |
| Kevlar 49 FRP | 248 |
| Carbon fiber composite | 255 |

Thus, the reader will observe that buoyancy is at least theoretically possible under very high pressure. Of course, it is much more desirable to achieve buoyancy at or below a pressure of 1 atmosphere. Obviously, the thin-walled cylinder approach cannot achieve this goal.

One can see in the equation above that if the modulus of elasticity can be increased, the pressure required for buoyancy would decrease. Of course, one cannot simply alter the modulus, as this is fixed for a given material. One can, however, alter the wall structure to produce the same result. For example, adding corrugations to the wall surface can increase the effective modulus by a factor of about nine and therefore decrease the critical pressure by a factor of about three.

One must be careful to preserve the strength in the circumferential direction. Because a cylinder under external pressure has twice as much compressive stress around its circumference compared to its long axis, it is acceptable (if using an isotropic building material) to lose 50% of the strength in the axial direction through changes in geometry (like corrugation) but it is undesirable to lose any strength in the circumferential direction. Thus, the corrugations should run around the circumference of the cylinder and not along its axis. For anisotropic materials, this technique is less effective because the fibers of the matrix are originally placed to provide strength only in the direction it is needed and thus any alteration of geometry that reduces strength in any direction (for an optimized fiber orientation) immediately requires weight increase.

Corrugation helps, but it cannot possibly achieve buoyancy at atmospheric pressure. Even the use of a complex "corrugation upon corrugation" approach—where the corrugated profile is itself corrugated—cannot achieve buoyancy. Clearly, a different approach is needed.

One can add internal pre-tensioned members for anti-buckling stabilization (in much the same way that tensioned bicycle spokes keep a bicycle wheel round). This technique is most effective against the "n=2" mode of deformation and thus, once it is employed, the most active mode of deformation may be the "n=3" mode (circle to pear shape) or some other mode. Unfortunately, the inclusion of such internal pre-tensioned members immediately adds structural weight. A relatively brief analysis indicates that it may be possible, through the use of multiple corrugations and internal stabilizers, to create a chamber which would achieve positive buoyancy at standard-air conditions. However, structural details would be very small and manufacture would be nearly impossible.

If, on the other hand, a design is created which places the walls primarily under tensile forces, most of the stability concerns are eliminated. Thus, a vacuum chamber wall design which experiences primarily tensile forces is desirable.

BRIEF SUMMARY OF THE INVENTION

The present invention comprises a vacuum chamber with an innovative wall structure. Instead of a conventional homogenous wall structure, the invention uses an array of internally-pressurized, thin-walled cells to contain an enclosed volume. The walls are arranged so that when a vacuum is present in the enclosed volume, the cell walls are placed in tension. In this way the potential modes of buckling instability are substantially reduced. The result is a much lighter vessel compared to a conventional homogenous wall vessel of similar strength.

BRIEF DESCRIPTION OF THE SEVERAL VIEWS OF THE DRAWINGS

FIG. 3B is a detail view, showing a junction in the wall construction.

FIG. 4 is a perspective view, showing an end cap used to seal off an open end of a vacuum chamber.

Figure 1:
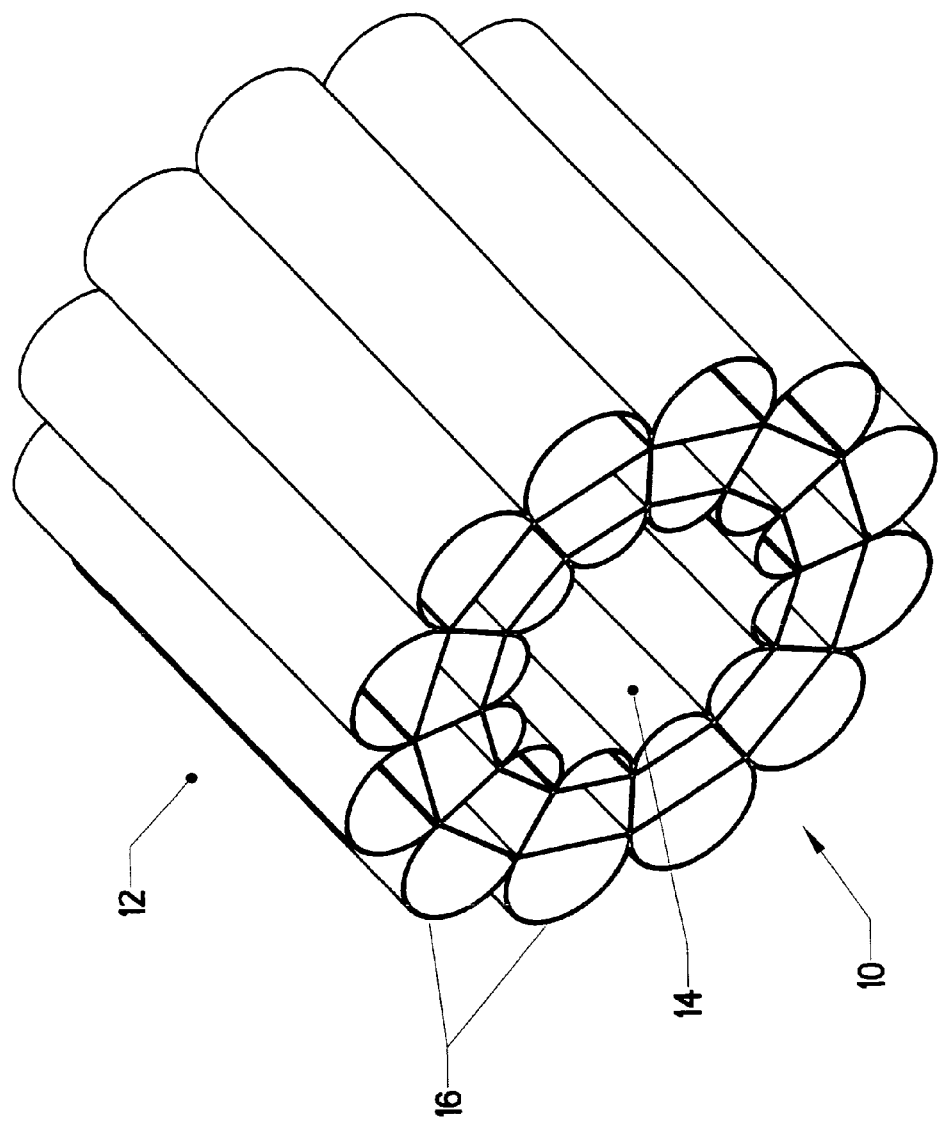
FIG. 1 is a perspective view, showing a vacuum chamber according to the present invention.

REFERENCE NUMERALS IN THE DRAWINGS 10 vacuum chamber
12 atmosphere
14 contained volume
16 cell
18 junction
20 conjoined portion
22 outer arcuate portion
24 inner arcuate portion
26 outer stabilizing web
28 inner stabilizing web
30 end cap
32 outer bellows
34 inner bellows
36 connecting member
38 dense cell vacuum chamber
40 alternating cell vacuum chamber
42 stabilizing pressure
44 ambient pressure
46 vacuum
48 escape valve
50 first layer
52 second layer
54 third layer
56 fourth layer
58 fifth layer
60 hexagonal cell
62 shear panel
64 inner convolution
66 outer convolution
68 connecting member
70 radial array
72 spherical array
74 cable
76 central junction
78 triangular cell

DETAILED DESCRIPTION OF THE INVENTION

The basic structure of the lightweight vacuum chamber will be described, followed by an explanation of the theoretical principles underlying its construction. Possible applications for the chamber will then be disclosed.

FIG. 1 shows vacuum chamber 10. Its "wall" is defined by a radial array of joined cells 16. These cells separate contained volume 14 from the surrounding atmosphere 12. The view shows only a portion of a complete chamber. Obviously, the open ends must be capped off in order to create a vacuum within contained volume 14. The cells in this example are linear, meaning that they have a fixed cross section projected in a direction which is parallel to the central access of the vacuum chamber.

Figure 2:
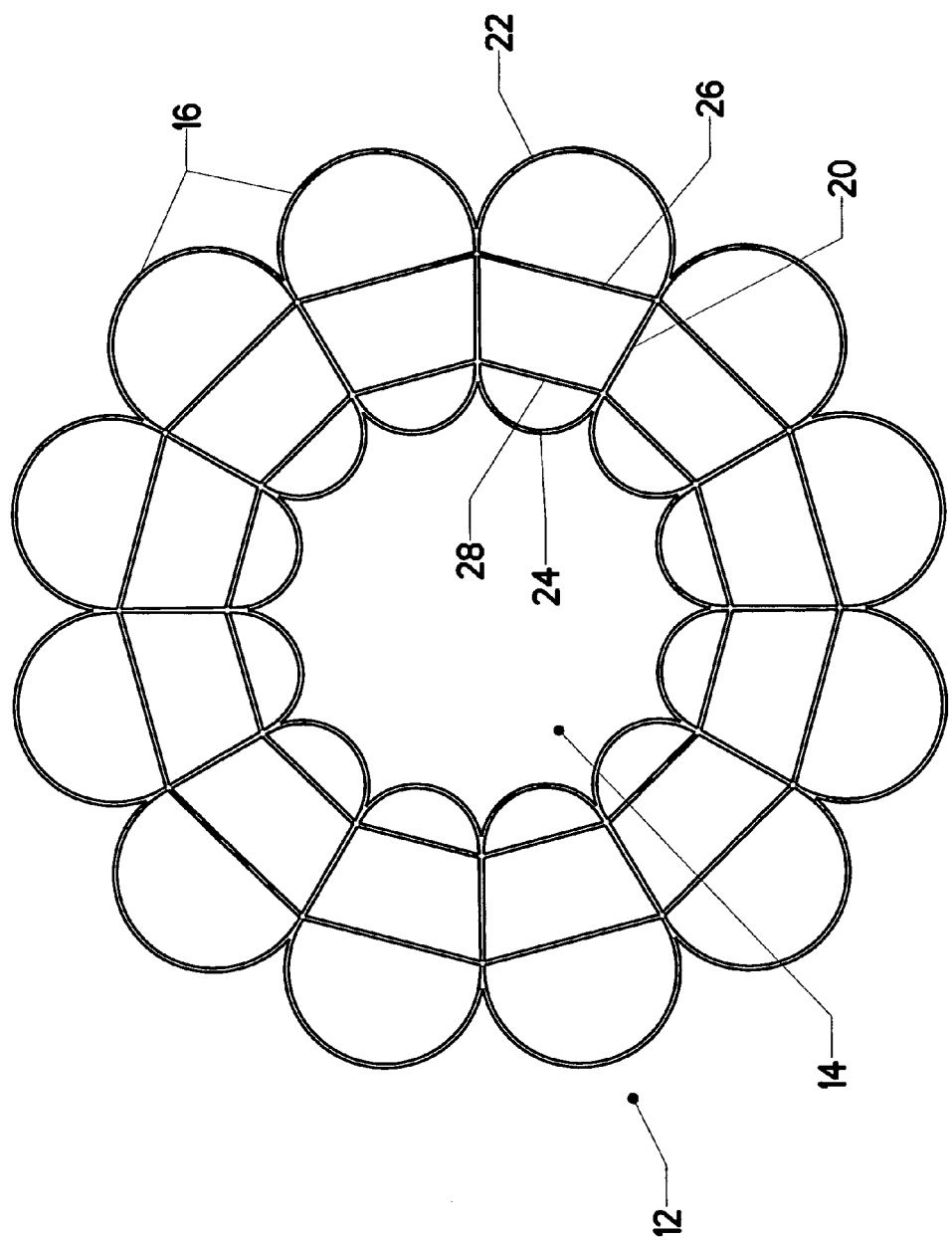
FIG. 2 is an elevation view, showing a vacuum chamber according to the present invention.

FIG. 2 is an elevation view of the same structure. Each cell 16 is defined by an enclosing cell wall. This cell wall can be divided into several distinct portions. These are: outer arcuate portion 22, inner arcuate portion 24, and two linear conjoined portions 20 (one on each side joining the inner and outer arcuate portions). In the embodiment shown, each cell also features an outer stabilizing web 26 and an inner stabilizing web 28.

The structure shown can be manufactured in many different ways. For instance, each cell can be made separately, then joined to form the radial array. In such an instance, each conjoined portion 20 might be two separate walls fused together. Alternatively, the structure can be manufactured so that each conjoined portion is a single wall thickness.

Figure 3:
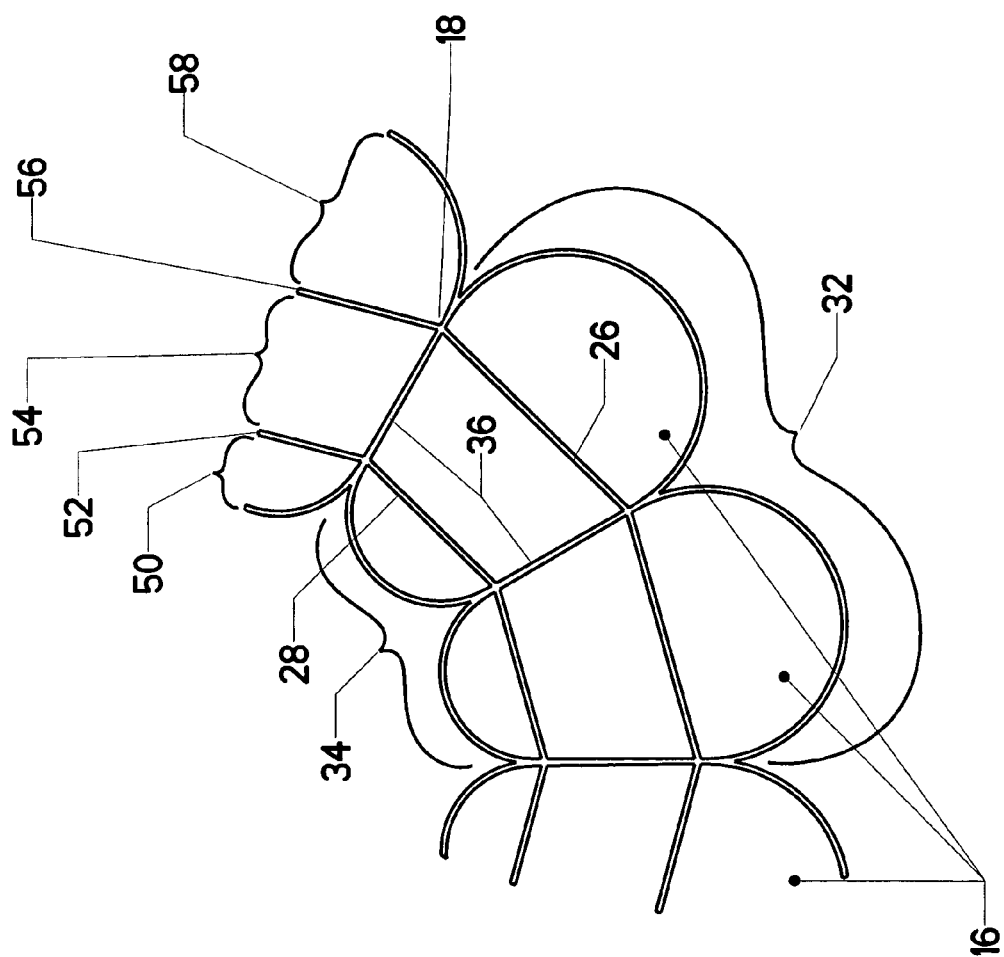
FIG. 3 is a detail view, showing the wall construction of the vacuum chamber.

FIG. 3 is a detail view of a portion of the same structure. It discloses an alternate nomenclature which can be useful for analysis. The series of outer arcuate portions can be made as one continuous length of material. It is then folded to form outer bellows 32 (with the term "bellows" being used to describe an accordion-like structure). The same can be done with the series of inner portions. A continuous length of material can form inner bellows 34. These inner and outer bellows can then be joined by a series of connecting members 36. The inner stabilizing webs 28 and outer stabilizing webs 26 can also be added.

In fact, the reader will observe that a set of two connecting members and the inner and outer stabilizing webs form a polygon. The manufacturing can start with a radial array of such polygons. The inner and outer bellows can then be added. The particular manufacturing method used is not particularly significant to the present disclosure. However, the nomenclature used in FIG. 3 is significant to understanding the analysis of the structure, which will be described subsequently.

A significant feature of the structure is its division into five layers, which are radially disposed outwardly from the central axis. First layer 50 is the convoluted structure of the inner bellows. Second layer 52 is the approximation of a ring formed by the inner stabilizing webs. Third layer 54 is formed by the connecting members 36. This third layer is made up of tensile members which are roughly parallel to a radial drawn from the chamber's center to its perimeter.

Fourth layer 56 is the approximation of a ring formed by the outer stabilizing webs. Fifth layer 58 is formed by the outer bellows. The reader will observe that the first and fifth layers are convoluted, while the second, third, and fourth are not. The reader will also observe that the junctions between the layers—denoted in the view as junctions 18—assume a particular form.

FIG. 3B shows the junctions in more detail. Since the structure is configured to place its components in tension, each wall shown in FIG. 3B can be generally referred to as a "tensile element." At the inner junction, the tensile elements of the first layer are nearly parallel to the tensile elements of the third layer. Likewise, at the outer junction, the tensile elements of the fifth layer are nearly parallel to the tensile elements of the third layer. By contrast, the tensile elements of the second and fourth layers are roughly perpendicular to those of the first, third, and fifth layers in the vicinity of the junctions.

The term "roughly" is used because the reader can readily observe the fact that the junction between the tensile members of the second and third layers is not 90 degrees. The example of FIGS. 1-3B uses only twelve cells. Thus, in order for the constituents of the second and fourth layers to lie along the circumference of the chamber, each must bend through 30 degrees as it joins to its neighbor. This fact means that the angle of intersection between the elements of the second and third layers (as well as the third and fourth) is approximately 75 degrees (for this particular example of 12 radially arrayed cells). Of course, for a chamber using a larger number of cells, the angle of intersection will be closer to 90 degrees. In FIG. 3B, the reader will observe how the geometry allows an even distribution of tension in the various members comprising the structure. The tension in the members is generally denoted as "T." However, this is not intended to indicate that the tension is equal in all members. The tension in the first, third, and fifth layers is similar, but may be drastically different from the tension on the second and fourth layers.

Returning briefly to FIG. 1, the reader will note that the open ends of the structure shown must be closed in order to create a vacuum within contained volume 14. FIG. 4 shows a suitable structure for enclosing the end, denoted as end cap 30 in the view. The end cap is joined with vacuum chamber 10 (one end cap on each end) to create an enclosed volume.

A variety of materials can be used for the walls of the vacuum chamber. Significantly, the material selection is not limited to rigid materials, since the forces experienced are primarily tensile forces. Thus, the walls can be made of conventional metals, flexible polymers, or other materials. The end cap has somewhat different design constraints, so it may require different materials.

Figure 5:
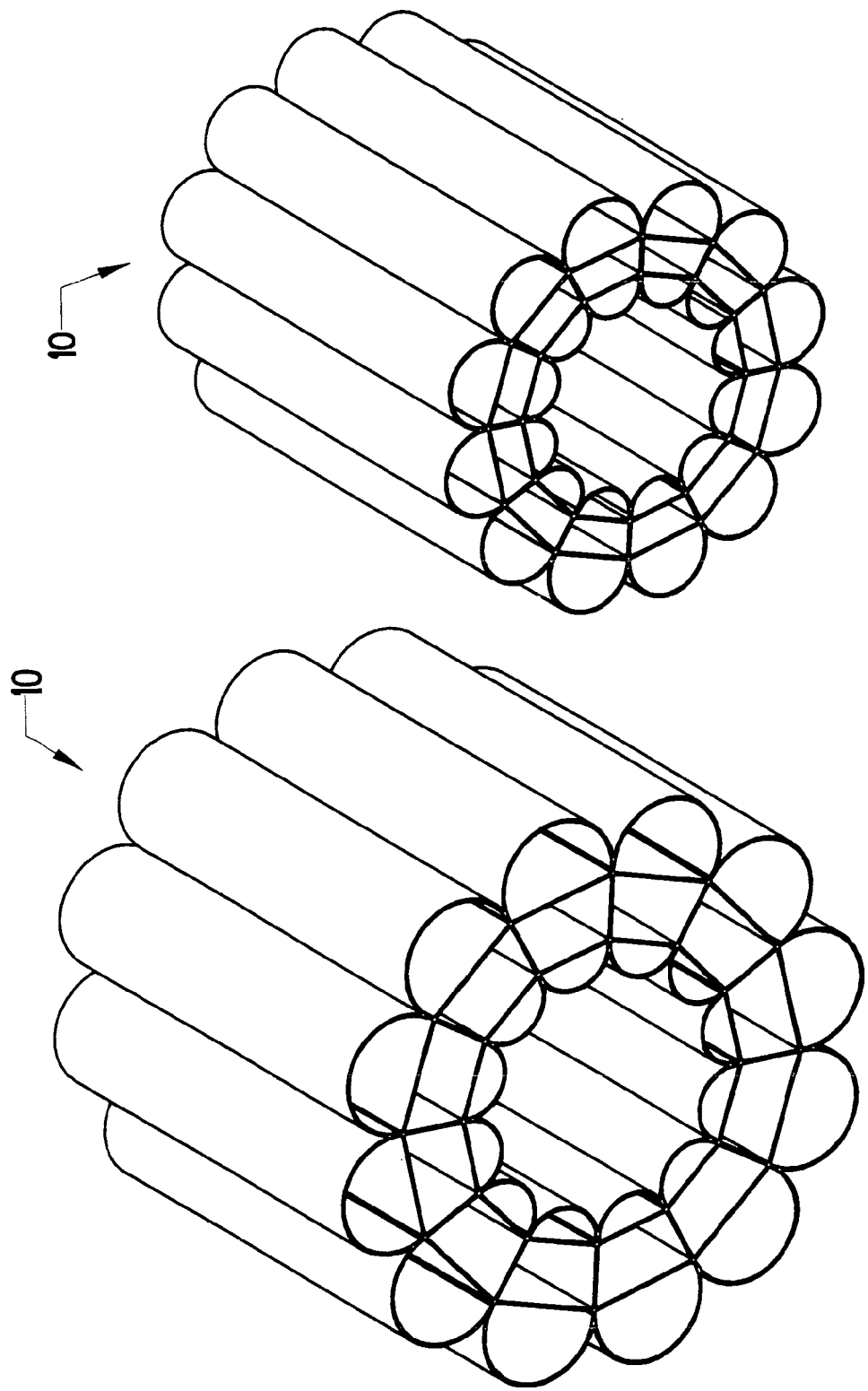
FIG. 5 is a perspective view, showing vacuum chambers of two different sizes.
Figure 6:
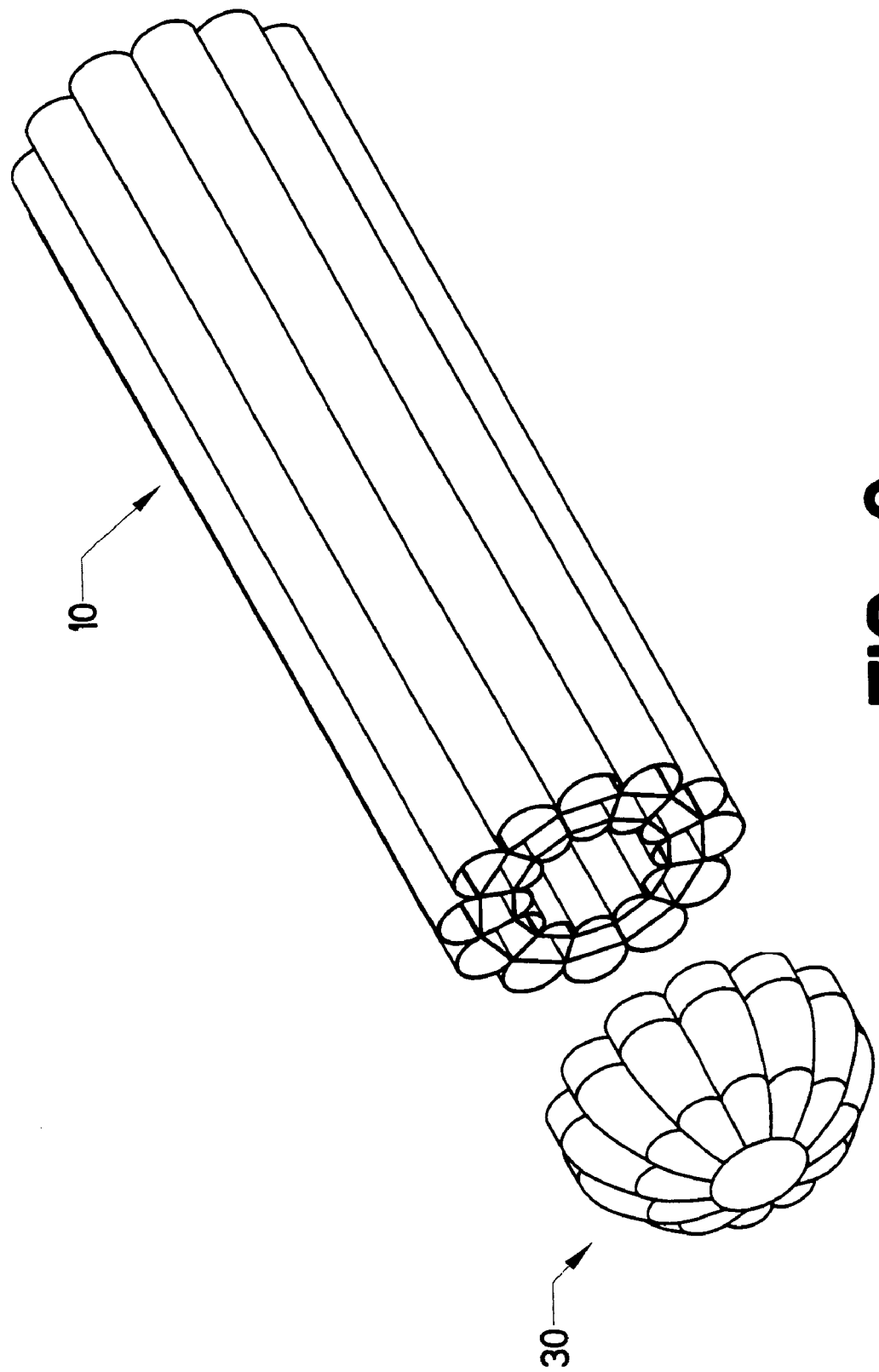
FIG. 6 is a perspective view, showing how the length of the vacuum chamber can be varied.

FIG. 5 shows two vacuum chambers 10 having the same number of cells. The dimensions are altered to create vacuum chambers of a different size. The structure is scalable, meaning that it can be used to create an infinite number of sizes. The same can be said of the chamber's length (for embodiments using linear cells). FIG. 6 shows a vacuum chamber 10 which is significantly longer.

Figure 7:
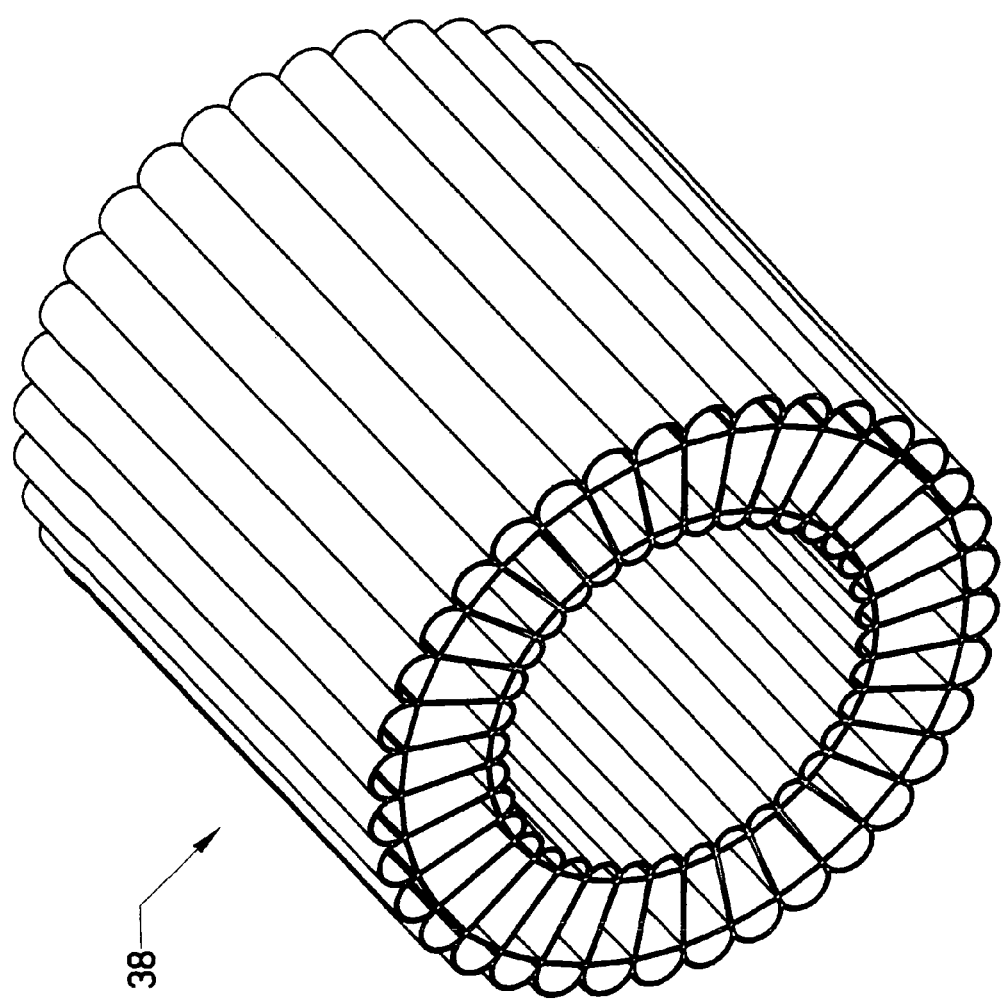
FIG. 7 is a perspective view, showing an alternate wall construction.
Figure 8:
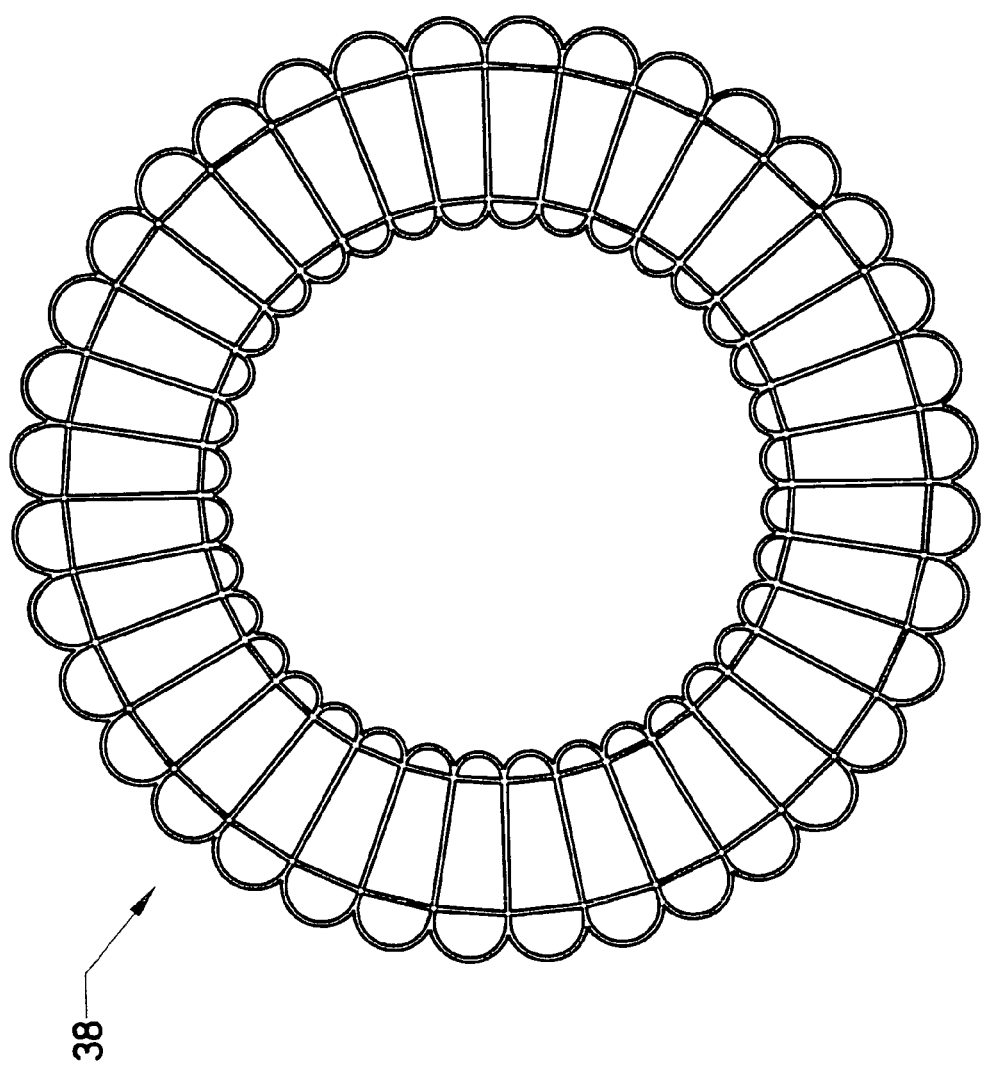
FIG. 8 is an elevation view, showing an alternate wall construction.
Figure 9:
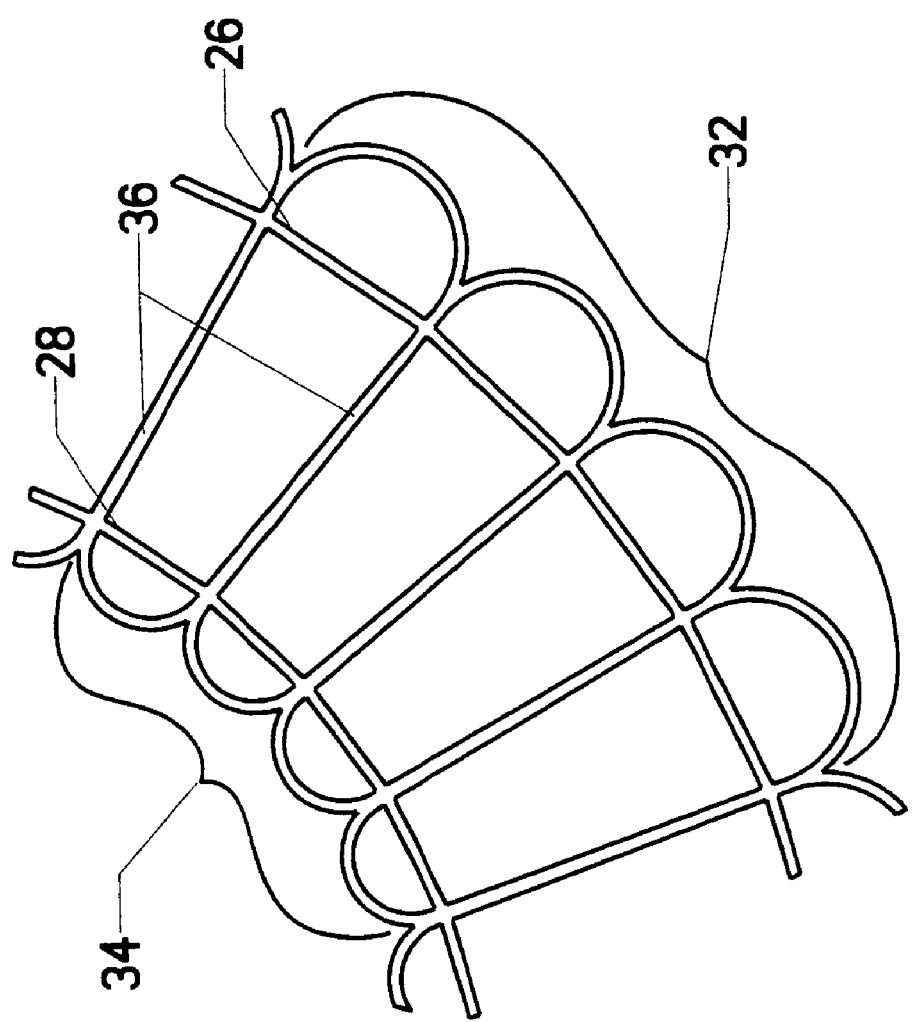
FIG. 9 is a detail view, showing an alternate wall construction.

The number of cells can be altered while maintaining the same basic structure. FIG. 7 shows an embodiment using more cells, denoted as dense cell vacuum chamber 38. FIG. 8 shows an elevation view of this structure. FIG. 9 shows a detail view of a portion of this structure. The reader will observe that—like the earlier version—it contains inner bellows 34, outer bellows 32, connecting members 36, inner stabilizing webs 28, and outer stabilizing webs 26.

The general operating principles of the vacuum chamber will now be discussed, followed by a detailed analysis. The reader will recall that FIG. 2 discloses an elevation view of a vacuum chamber constructed according to the present invention. The interior of all the cells 16 are pressurized to a level beyond that of the surrounding atmosphere 12. Each cell can be divided by the two stabilizing webs. In order to facilitate even pressurization, it may be desirable to have some gas passages in these stabilizing webs which allow flow within each cell.

All the cells are intended to be pressurized equally. Thus, it may also be desirable to have some gas passages between adjoining cells. These passages would be through conjoined portions 20, using the nomenclature shown in FIG. 2.

Since all the cells will be pressurized evenly, those skilled in the art will realize that all the walls defining the vacuum chamber will thereby be placed primarily in tension. If the gas within contained volume 14 is at least partially evacuated (while the chamber's ends are sealed), then an effective vacuum chamber is created. The chamber is significantly lighter than conventional thick-walled structures.

A detailed analysis for the structure will now be presented. An objective is to create a vacuum chamber having a relatively low mass. If such a chamber can displace a mass of air within contained volume 14 that is greater than the mass of the chamber itself (along with the gas within the cells and the end caps), then the vacuum chamber will achieve positive buoyancy within the earth's atmosphere. The following analysis considers the conditions required to achieve positive buoyancy, and demonstrates that positive buoyancy can be achieved using existing materials.

The geometry required to achieve positive buoyancy is size invariant. This is because all forces originate from pressure and not weight. These forces therefore grow as linear-dimension-squared functions rather than linear-dimension-cubed functions. Likewise, the strength of each member depends on its cross sectional area. It will therefore also grow as a linear-dimension-squared function. Furthermore, all deformation energies grow as length-cubed-functions, meaning that the elastic stability analysis is also size invariant. Thus, a solution which works for a chamber of one size can be used to generate an infinite number of chambers of different sizes.

The reader will note that most difficulties in the design of conventional vacuum chambers arise from deformation failure in the sense that thin members under compression tend to buckle. At this point, the comparison of an arch bridge and a suspension bridge provides guidance. An arch is loaded primarily in compression. Thus, any arch design must carefully consider stability, since it will typically fail by instability rather than exceeding the material's compressive strength.

A suspension bridge, on the other hand, is loaded primarily in tension. It is essentially an inverted arch. The tensile loading makes it inherently stable. Thus, a suspension bridge can be made of thin and flexible members. This comparison serves to inspire an analogous structure for a vacuum chamber.

Returning to FIG. 2, the perimeter of each cell 16 transmits the tension required to "support" the vacuum. Theoretical analysis shows that the minimum weight of such a structure (given a fixed inside diameter and an outside diameter that is only slightly larger) is the same as the weight of the corresponding unstable thin-walled cylinder (assuming the same tensile and yield strengths), thus overcoming the restriction of the critical pressure. Furthermore, because the outer diameter can now be increased without increasing the inner diameter, extra buoyancy can be achieved. Thus, the prior limitation of the critical temperature can be overcome as well.

The equilibrium and stability of the lightweight vacuum chamber is governed by its change in potential energy U under deformation. For equilibrium, the first derivative of the potential energy with respect to any deformation must be zero, which is expressed as:

$$\frac{\partial U}{\partial x_a} = 0,$$

where $x_a$ are the degrees of freedom of the system.

For stability, the second derivative of the potential energy with respect to any deformation must be positive, meaning that the matrix $$\frac{\partial^2 U}{\partial x_a \partial x_b}$$

has only positive eigenvalues.

These principles can be applied to consider the stability of the structure shown in FIG. 2. Rather than the 12 cells shown in FIG. 2, a similar structure having a very large number of cells (N cells) will be considered. The inner radius of the chamber will be considered uniform, since the variation caused by the presence of the inner bellows is negligible for a very large number of cells. The outer radius of the chamber will likewise be considered uniform, since the variation caused by the outer bellows is also small for a structure having a large number of cells. The outside radius will be denoted as R as a proportion of the inner radius.

It will be assumed that a complete vacuum exists within the chamber, and that an absolute pressure of P atmospheres exists between the inner surface and outer surface (the pressure within the cells). The ambient pressure outside the chamber is assumed to be one atmosphere.

In order to ensure that the first derivative of U is zero with respect to every possible deformation, the first derivative of U with respect to the displacement of each element of the structure (the force on each element of the structure) should be zero. The radial force per unit area on the inner surface can be written as:

$$-P + \frac{TN}{2\pi} = 0 \quad \text{(Equation 3)}$$

T is the tension per unit length in the members connecting the inner and outer surface (connecting members 36 in FIG. 3). The force per unit area on the outer surface can be written as:

$$P - 1 - \frac{TN}{2\pi R} = 0 \quad \text{(Equation 4)}$$

In this expression, the "−1" accounts for the fact that there is one atmosphere of ambient pressure. Combining Equations 3 and 4, one can write:

$$P = \frac{R}{R-1} \text{ and} \quad \text{(Equation 5)}$$

$$R = \frac{P}{P-1} \quad \text{(Equation 6)}$$

From these expressions the reader will observe that as the radius of the outer surface becomes closer to the radius of the inner surface, the pressure contained within the cells must be increased in order to maintain equilibrium.

Given that ρ represents the density to strength ratio of the material used to construct the vacuum chamber in units of ambient air density and ambient air pressure, the mass of the connecting members must (at a minimum) be:

$$T\rho(R-1)N$$

Substituting in Equations 3, 5, and 6, this expression can be reduced to:

$$2\pi R\rho$$

As the number of cells N becomes large, the mass of the inside bellows must (at a minimum) be:

$$T\rho 2\pi \frac{\pi}{2} = \frac{2\pi P}{N}\rho\pi^2$$

The reader will observe from this expression that as the number of cells N becomes very large, the mass of the inner bellows (and similarly, the outer bellows) becomes proportionally smaller and can be neglected in the analysis. Thus, as the number of cells N becomes very large, the only significant component of the total mass is the mass of the connecting members. These tend toward a minimum of $2\pi\rho$ as R approaches unity. The reader should also note that the mass of the stabilizing webs can be relatively small since when the pressure within the cells and the vacuum within the chamber are balanced, the stabilizing wbs transmit no tension. Thus, they can be made of relatively thin material.

Of course, the preceding only considers yield failure. The stability analysis is considerably more complex, for several reasons. First, it is no longer sufficient to consider the displacement of each element separately. The stability analysis deals with second derivatives instead of first derivatives, and thus there are derivatives associated with correlations between the displacements of different elements. Furthermore, even after all these derivatives are computed, it is not useful to confirm that each is positive separately, as a change of basis can introduce new negative elements.

To analyze the stability of a system, one must first specify the degrees of freedom. For the analysis to be absolutely valid, one must include all degrees of freedom (an infinite number in a continuous system). Consideration of all degrees is impossible. One must therefore make simplifying assumptions. One must then form the matrix in this basis, defining the second derivative of the potential energy. Finally, one must confirm that this matrix is positive definite (confirming that it has only positive eigenvalues).

Figure 16:
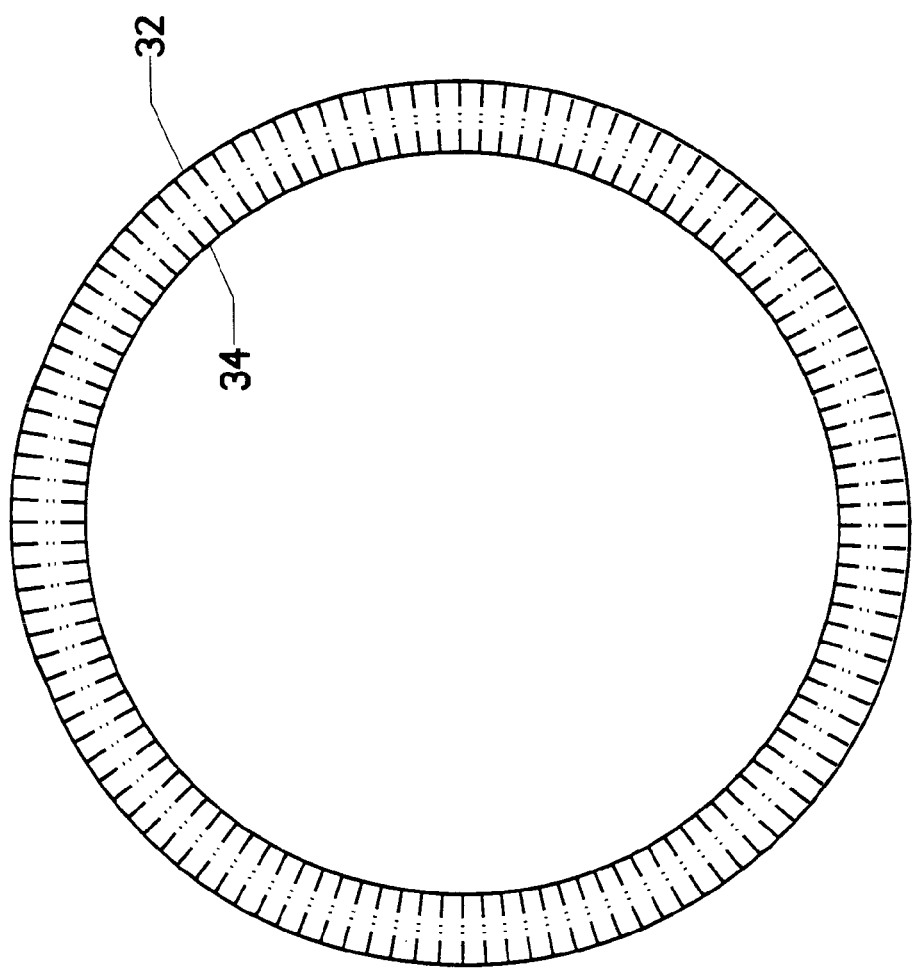
FIG. 16 is a schematic view, showing an analysis of the vacuum chamber.

FIG. 16 is a schematic view of a lightweight vacuum chamber constructed according to the present invention. The dotted lines represent the connecting members (There would typically be many more such connecting members than are shown). As N is very large, the undulations in the inner and outer bellows are not shown. For this embodiment, N is large, R is close to unity, and $N(R-1)\gg 1$.

Figure 15:
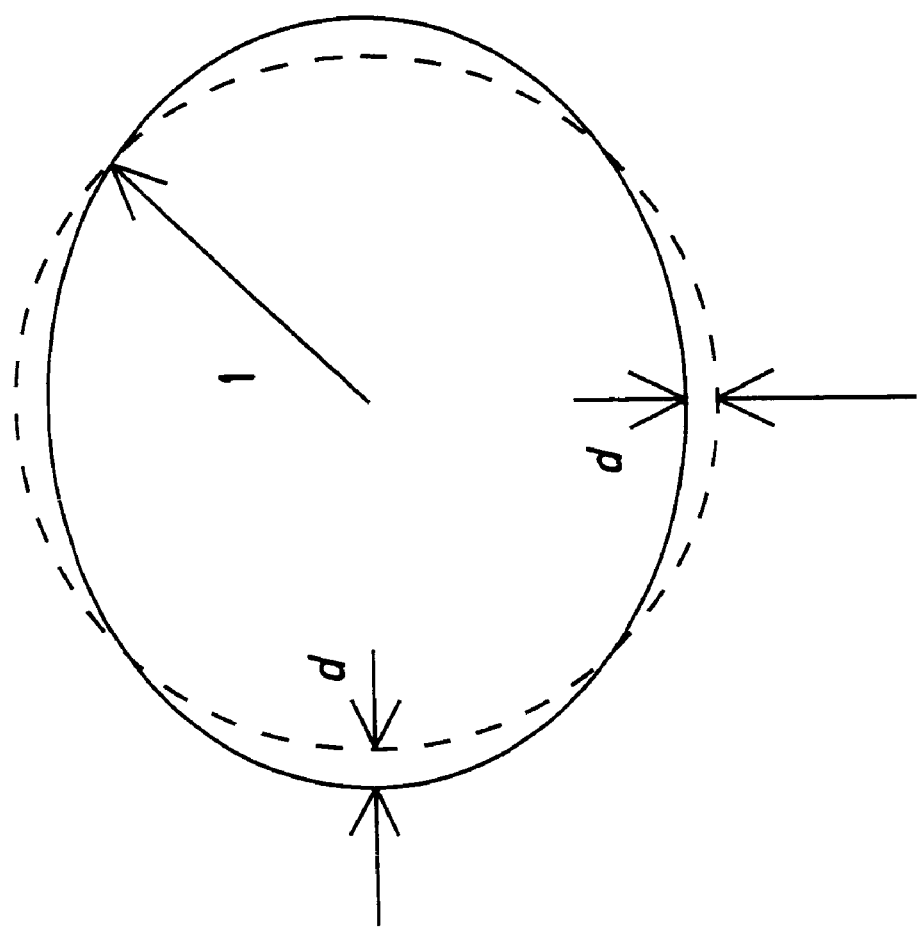
FIG. 15 is a schematic view, showing deformation in a vacuum chamber.

It is assumed that the most active mode of deformation will be similar to the "n=2" or "circle to ellipse" mode as found in the conventional vacuum chamber (illustrated in FIG. 15). Using the same deformation parameter d discussed earlier, one can compute the deformation energy. To calculate this energy, one must assume the way in which the individual components displace to create the elliptically deformed state.

First, one can assume that the bulk of the potential energy change is in the gas compressed within the cells rather than in the deformation of the inner wall, the outer wall, and the connecting members. This assumption can be made because the Young's modulus to pressure ratio for a gas is much lower than the elastic modulus to tensile strength ratio for the solid wall material (A gas has very little stiffness). Thus, the solid wall components are relatively rigid and the gas is relatively elastic.

Figure 17:
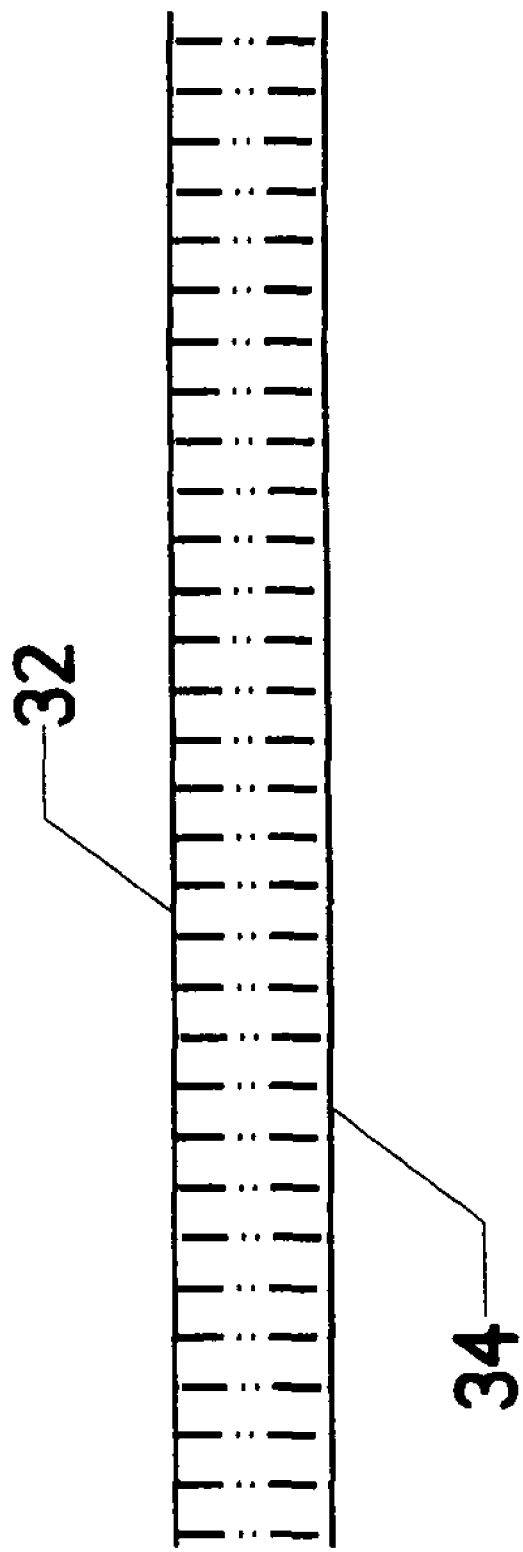
FIG. 17 is a schematic view, showing an analysis of the vacuum chamber.
Figure 18:
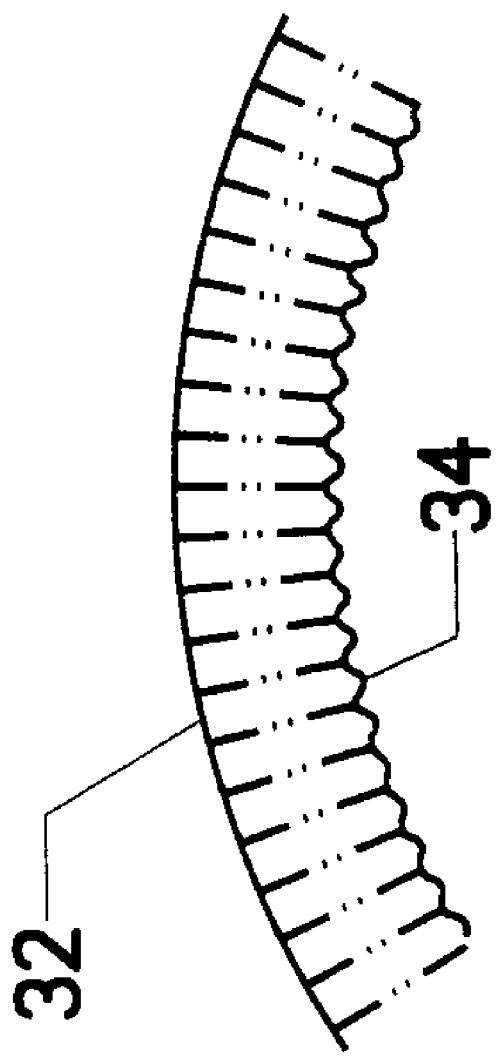
FIG. 18 is a schematic view, showing an analysis of the vacuum chamber.

FIG. 17 shows a portion of the chamber wall straightened to simplify the initial analysis. Inner bellows 34 (shown straight) is joined to outer bellows 32 by the connecting members. In order to obtain the elliptical deformation state, the curvature of portions of the chamber wall must be altered. FIG. 18 shows one such deformation state, in which inner bellows 34 has deformed to allow curvature of the wall as a whole.

In the limit of small curvature, the change in potential energy per unit area associated with this deformation is:

$$P\Delta V = \frac{R}{R-1}(R-1)\frac{1}{2}(|\Delta curvature|)$$

This energy depends on the absolute value of the curvature. Thus, when the curvature is zero, the second derivative of the potential energy with deformation is infinity. Thus, this mode of deformation is inactive and likely will not represent the critical determinant of instability.

Figure 19:
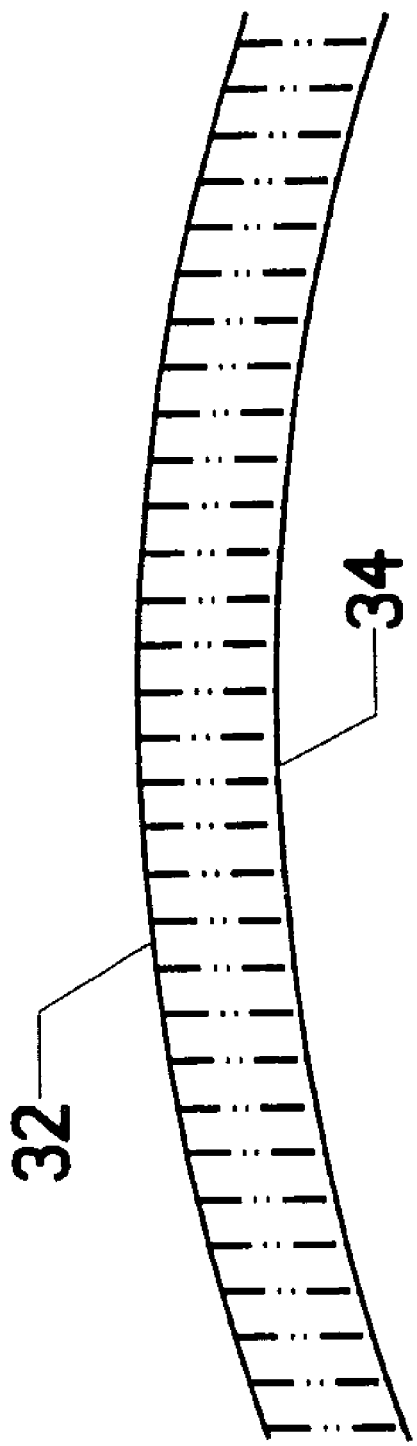
FIG. 19 is a schematic view, showing an analysis of the vacuum chamber.

FIG. 19 shows a second possible deformation state. Again, in the limit of small curvature, the change in potential energy per unit area associated with the deformation can be written as:

$$P\Delta V = \frac{R}{R-1}(R-1)\frac{1}{2}\left(\int (\Delta curvature)d\theta\right)^2$$

The energy associated with this deformation mode depends on the square of the integral of the curvature. Given that this changes as the square of any overall factor in the curvature, it is likely to be the critical mode with respect to instability.

Assuming this to be the critical mode, one can compute the deformation energy and vacuum energy to determine the pressure P below which instability occurs. Vacuum energy is the same as before $$\left(-\frac{3}{2}d^2\pi\right),$$

where the ambient pressure P is now taken as the unit pressure. Assuming that R is close to unity, the deformation energy can be written as:

$$\int_0^{2\pi} P(\Delta V)d\theta = \int_0^{2\pi} R\frac{1}{2}\left(\int (\Delta curvature)d\theta\right)^2 d\theta$$
$$= \int_0^{2\pi} \frac{1}{2}\left(\int (3d\cos(2\theta))d\theta\right)^2 d\theta$$
$$= \int_0^{2\pi} \frac{1}{2}\left(3d\frac{1}{2}\sin(2\theta)\right)^2 d\theta$$
$$= \frac{9}{8}d^2\pi$$

This expression is ¾ of the vacuum energy with opposite sign. Thus, the pressure P must be larger than R/(R−1) by a factor of 4/3 to achieve stability. While this calculation assumes that R is close to unity, the result agrees well with experimental results (where R was 2.00), which showed that the internal cell pressure must be increased approximately 40% to achieve stability. The experiment also visually demonstrated that the critical instability mode was similar to the elliptical form, with microscopic deformation consistent with FIG. 19.

It thus appears that the FIG. 19 deformation mode is the most important mode for stability. Design measures can then be made to make the FIG. 19 deformation mode less energetically favorable. FIG. 7 shows a vacuum chamber having a relatively large number of cells (denoted as dense cell vacuum chamber 38). FIG. 8 shows this structure in an elevation view, with FIG. 9 showing the features in greater detail.

The reader will observe that the structure is the same as that shown in FIG. 3 (having the same five layers). The dimensions are altered, due to the fact that many more cells are present. However, both versions have the same inner bellows (first layer), connecting members (third layer), outer bellows (fifth layer), inner stabilizing webs (second layer), and outer stabilizing webs (fourth layer). Thus, the analysis of the elliptical deformation mode will be similar for these two embodiments.

Figure 10:
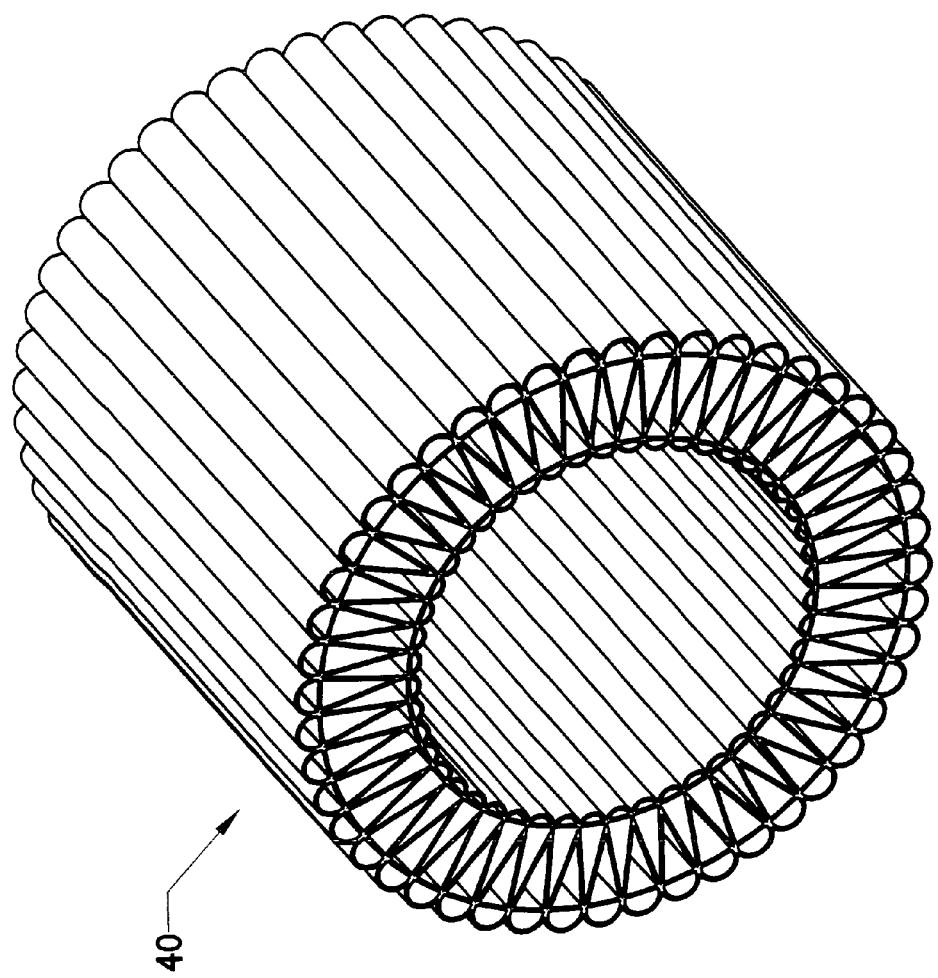
FIG. 10 is a perspective view, showing a second alternate wall construction.

However, one can alter this design to change the analysis. FIG. 10 shows a different structure for the vacuum chamber in which adjacent cells have been "folded" around the perimeter. This embodiment is denoted as alternating cell vacuum chamber 40.

Figure 11:
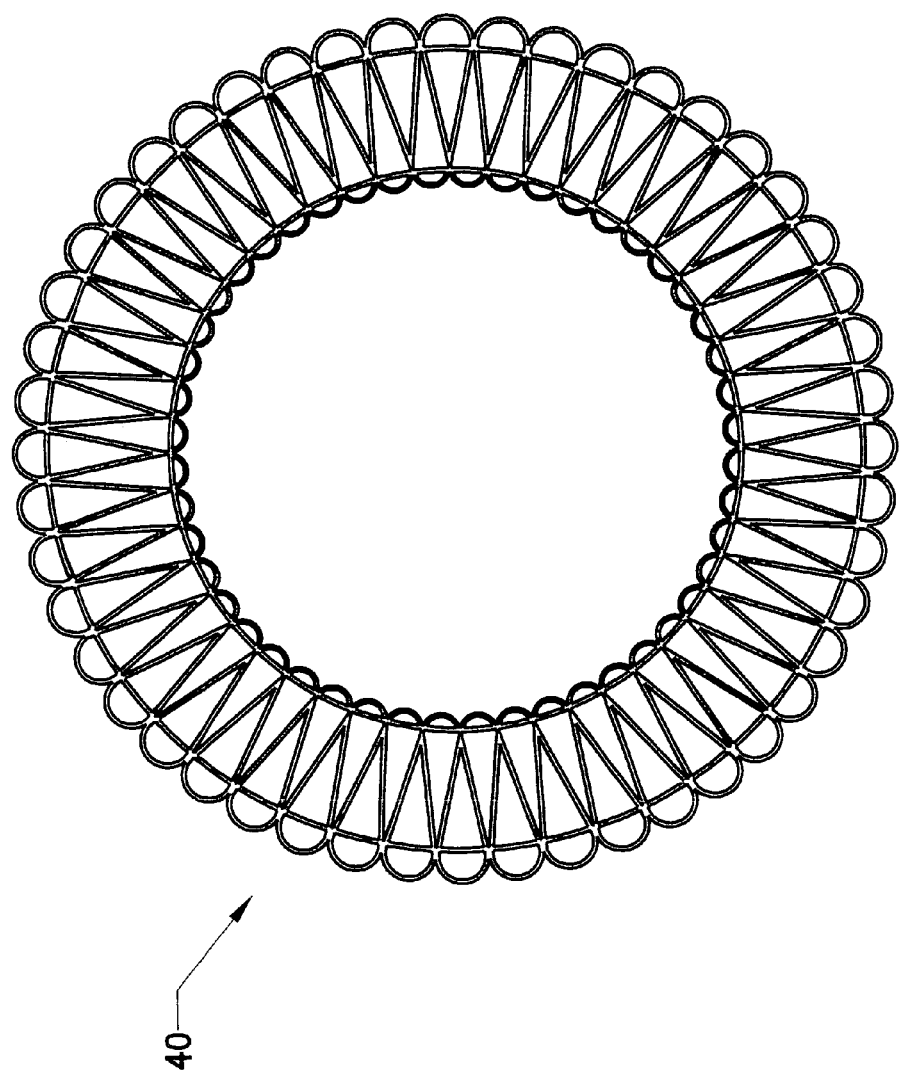
FIG. 11 is an elevation view, showing a second alternate wall construction.
Figure 12:
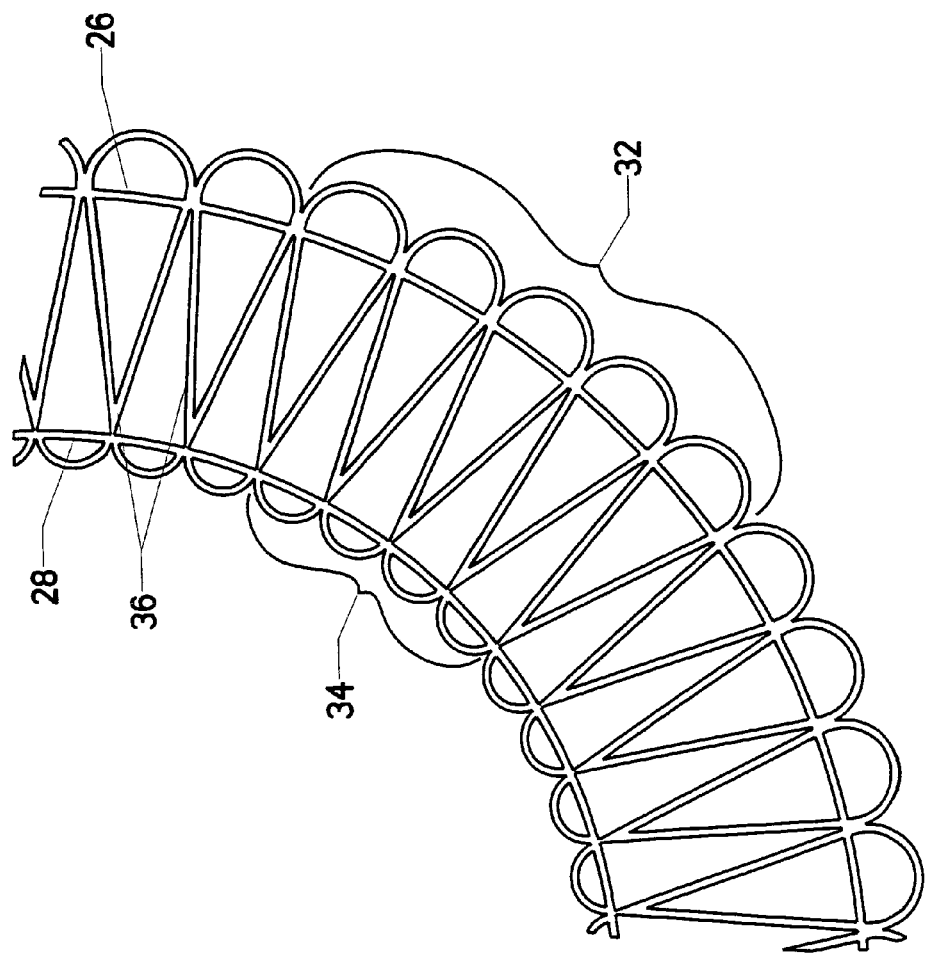
FIG. 12 is a detail view, showing a second alternate wall construction.

FIG. 11 shows an elevation view of this embodiment, while FIG. 12 shows a detailed view of a portion of the wall. The reader will observe that inner bellows 34 and outer bellows 32 remain. However, the two bellows have been radially offset. Connecting members 36 have been reconfigured to attach to the radially offset bellows in an alternating pattern, thereby creating approximately triangular cavities. However, the five layers of the design remain. The same conditions also apply at the junctions. The radial offset does alter the angles of intersection somewhat, but the joints between the first and third layer (as well as the third and fifth) are still nearly tangent. Likewise, the joints between the second and third layer (as well as the third and fourth) are still nearly perpendicular.

The energy of the most active mode of deformation can be recomputed for this alternative design. This energy varies with the absolute value of the change in curvature, rather than with the square of the change in curvature (as for the non-folded design). Thus, with the embodiment shown in FIGS. 11 and 12, the second derivative of the deformation energy d is infinite at equilibrium while the second derivative of the vacuum energy remains negative and of finite size. The revised design is therefore much more stable with respect to the primary deformation mode.

Of course, one needs to maintain a sufficient separation between the inner and outer bellows in order to maintain stability. As R (the theoretical radius of the outer bellows) tends toward unity, the structure approaches that of a thin-walled cylinder and will become unstable since it will no longer be valid to assume that the solid is infinitely stiff. Given that the total mass of the stabilizing webs is approximately the same as the total mass of the connecting members (which would be the minimum required mass to resist tensile failure when there is pressure within the cells but no vacuum within the chamber), one can calculate the minimum R at which the structure remains stable. For stainless steel, as an example, the minimum R is about 17/16.

Figure 20:
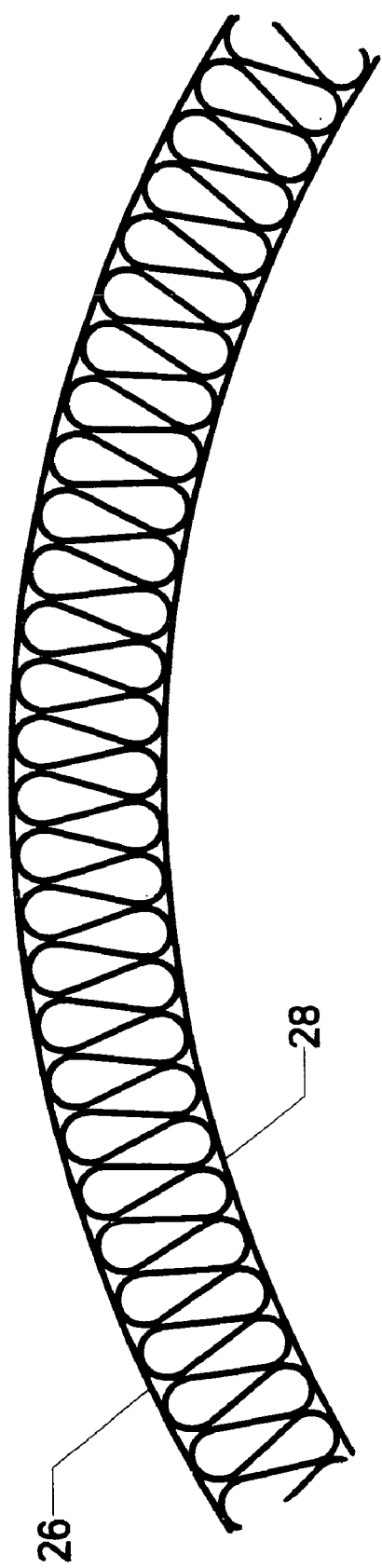
FIG. 20 is an elevation view, showing an alternate wall construction.
Figure 21:
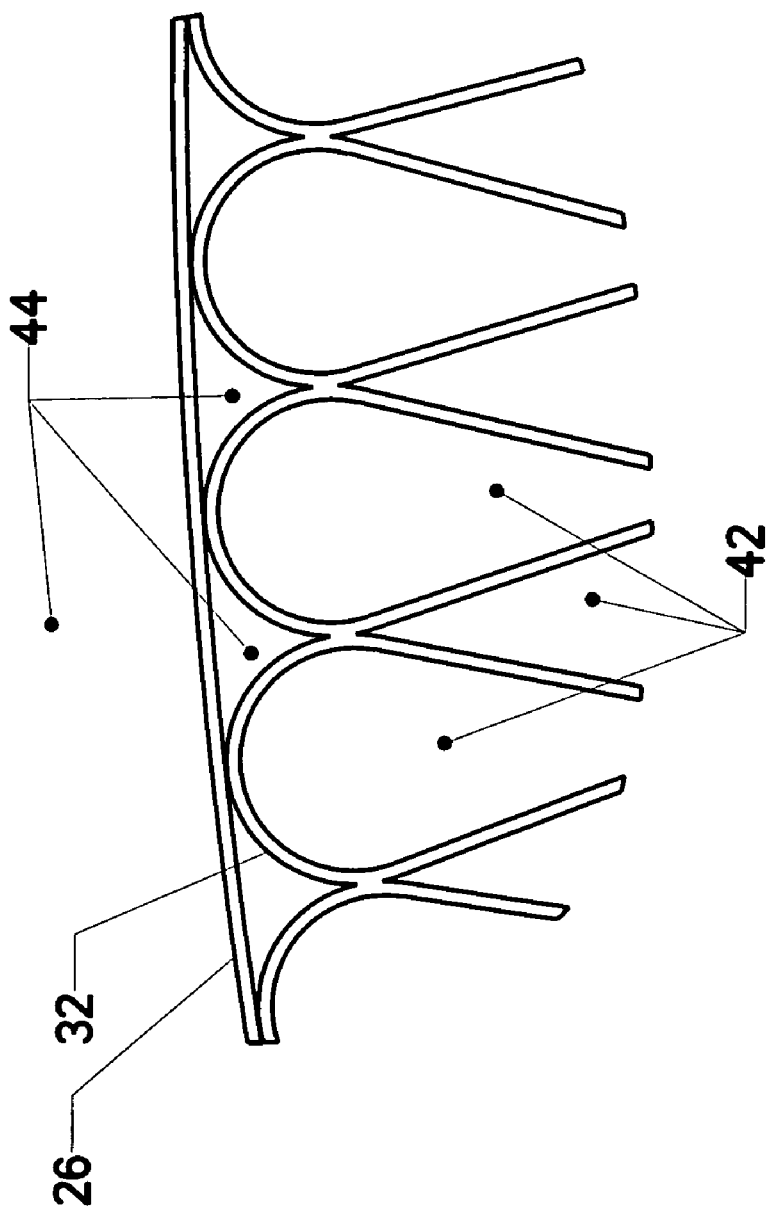
FIG. 21 is a detail view, showing an alternate wall construction.

Those skilled in the art will realize that the structure shown in FIGS. 11 and 12 presents some manufacturing difficulties. A simpler structure has advantages. One possibility is to move the inner and outer stabilizing webs from the inside of the pressurized cells to the outside. FIG. 20 is an elevation view of a portion of a wall constructed according to this approach. The reader will observe that the stabilizing webs are now external. Although this structure may be less stable than the one shown in FIGS. 11 and 12, it is still sufficiently stable to achieve positive buoyancy. The pressure is still contained within the cells. However, this pressure is not contained by the stabilizing webs. FIG. 21 shows a detailed view of the wall proximate outer stabilizing web 26. Stabilizing pressure 42 is contained within the cells. However, ambient pressure 44 is found both outside the wall and in the gaps between outer stabilizing web 26 and outer bellows 32. Gas passages must be provided through the outer stabilizing web to ensure that the ambient pressure and the pressure within these gaps remains equal.

Figure 22:
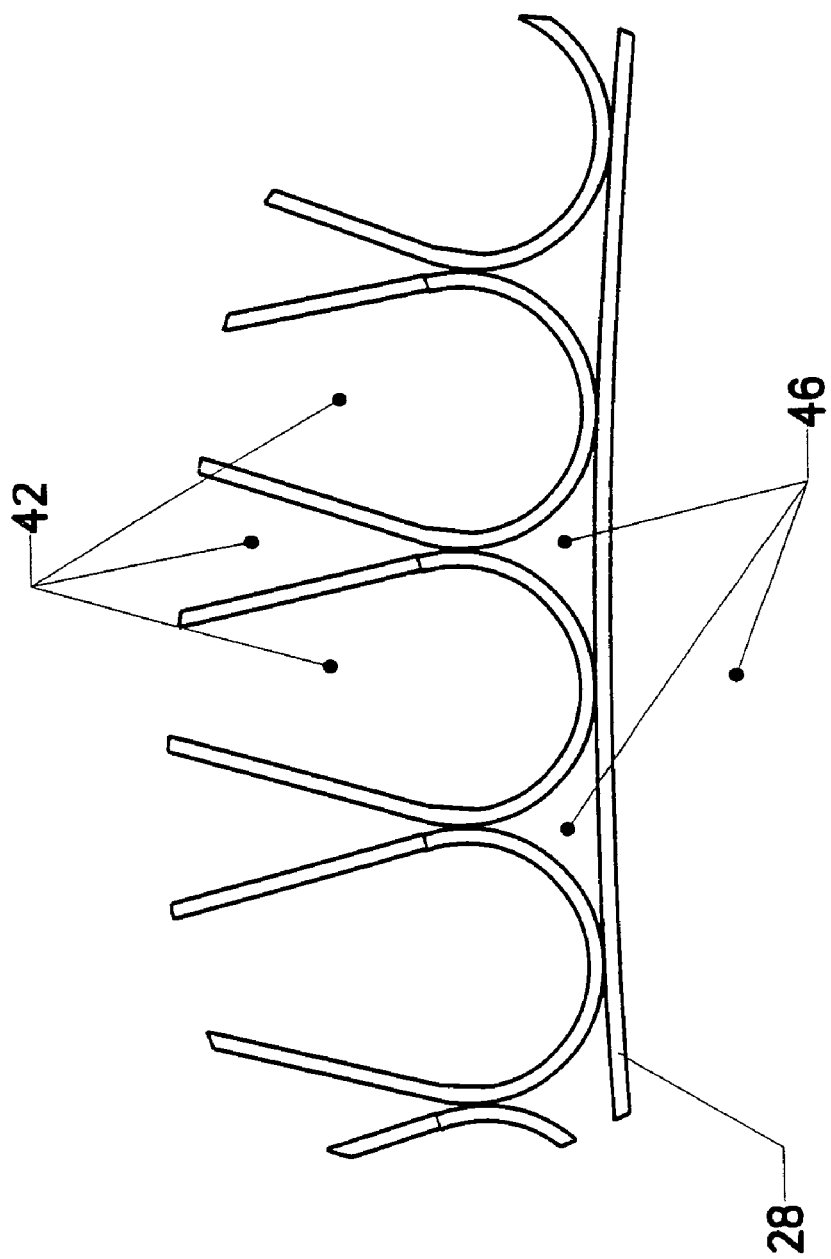
FIG. 22 is a detail view, showing an alternate wall construction.

FIG. 22 shows a detailed view of the wall proximate inner stabilizing web 28. Vacuum 46 is present inside the vacuum chamber and in the gaps between inner stabilizing web 28 and inner bellows 34. Gas passages must be provided between the enclosed volume and these gaps to ensure that the vacuum remains equal.

Having now reviewed several embodiments of the proposed structure in detail, it is possible for the reader to understand and generalize the novel features of the present invention. Returning to FIG. 3, the reader will recall the structure of a cylindrical vacuum chamber comprised of a radial array of conjoined cells 16. Each cell is constructed of five layers. Starting from the interior, these are labeled as first layer 50, second layer 52, third layer 54, fourth layer 56, and fifth layer 58. First layer 50 must be a convoluted shape. The same is true for fifth layer 58. Second layer 52 and fourth layer 56 must be comprised of straight tensile members which are generally perpendicular to a radial passing through the center of the cylindrical vacuum chamber. Third layer 54 must likewise be comprised of straight tensile members. However, these should be roughly parallel to a radial passing through the center of the cylindrical vacuum chamber.

The conditions present at the intersections between the layers are also important. The walls of the first and third layers should be tangent (or nearly so) where they are in close proximity to each other. The walls of the third and fifth layers should likewise be nearly tangent when they are in close proximity to each other.

For the second and fourth layers, a nearly perpendicular orientation is required. The walls of the second layer should be roughly perpendicular to the walls of the first and third layers where they are in close proximity to each other. The walls of the fourth layer should be roughly perpendicular to the walls of the third and fifth layer when they are in close proximity to each other. Those skilled in the art will realize that the walls of the second and fourth layer may need to be several degrees off perpendicular in order to form the desired cylindrical cross section when the cells are combined. The embodiment of FIG. 3 includes twelve cells in a radial array. For that particular geometry, the intersection between the walls of the third layer and the second and fourth layers must be 15 degrees off of perfectly perpendicular. Thus, the term "roughly perpendicular" will be understood to encompass such variations.

All the preceding embodiments have presented linear cells (long and slender) being combined to form a cylindrical vacuum chamber. The principles just described, however, are not confined to linear cells. Other types of cells can be used to form vacuum chambers. One common example is the need for a spherical vacuum chamber. The linear cells cannot define such a shape. Hexagonal cells, however, can.

Figure 23:
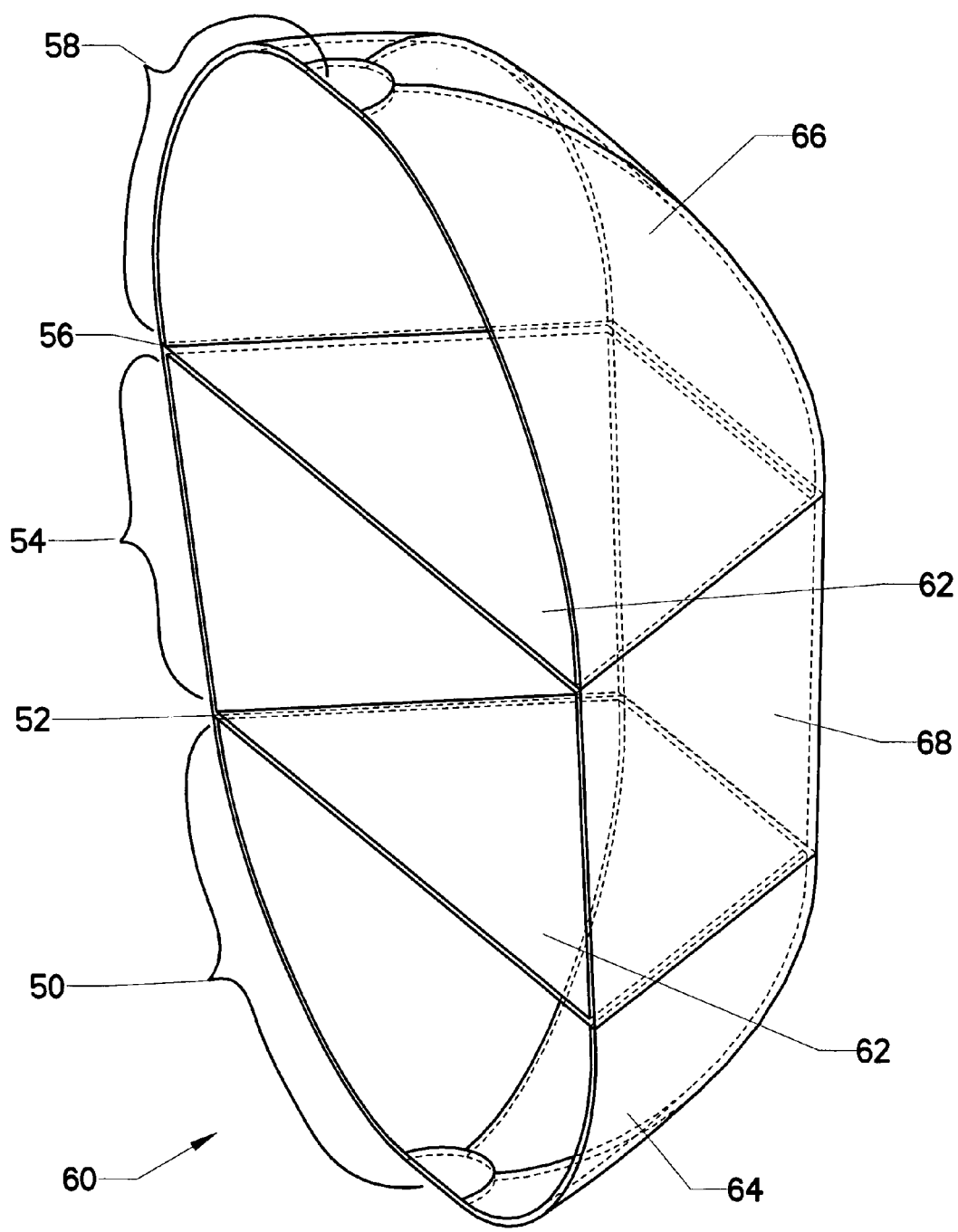
FIG. 23 is a sectioned view of a hexagonal cell constructed according to the present invention.

FIG. 23 shows hexagonal cell 60 (shown sectioned in half to show internal details). It retains the five layers used for the linear cells. However, rather than being long and slender, the hexagonal cell uses a six-sided central polygon. The upper and lower convoluted layers are formed by a blended wall shape in which a hexagon smoothly transitions into an approximation of a spherical dome. It is still an arcuate shape, but it is obviously more complex than the arcuate shape needed for the linear cells.

Figure 24:
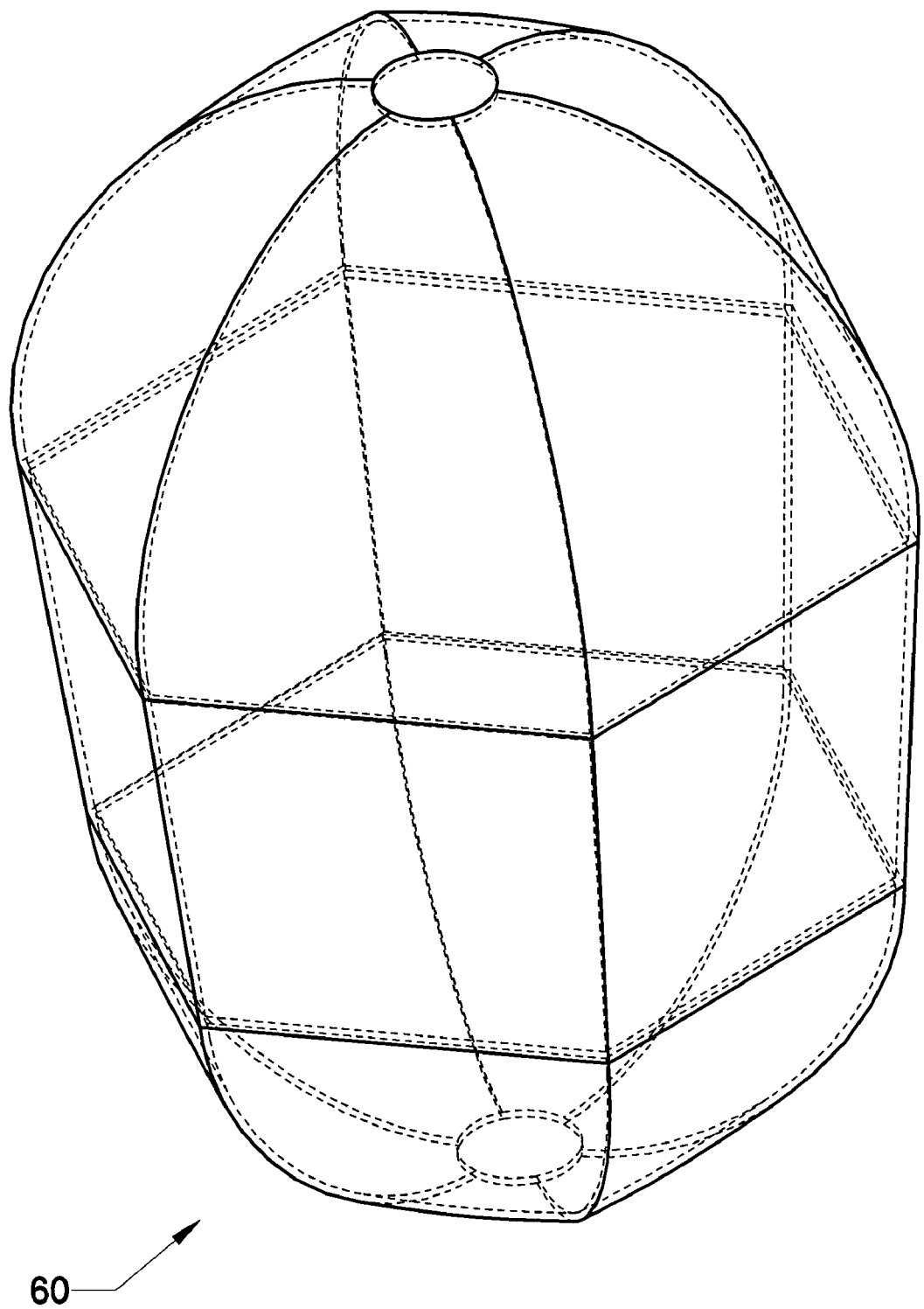
FIG. 24 is a perspective view, showing the cell of FIG. 23 without the sectioning cut.

Third layer 54 is formed by six connecting members 68 formed into a hexagon. The hexagon thus formed has an inward facing opening and an outward facing opening. These are closed by a pair of shear panels 62 (which form the second and fourth layers). Inner convolution 64 serves as the convoluted surface required for first layer 50. Outer convolution 66 serves as the convoluted surface required for fifth layer 58. FIG. 24 shows the same cell in a non-sectioned state, so that the reader may easily observe all six sides.

Figure 24B:
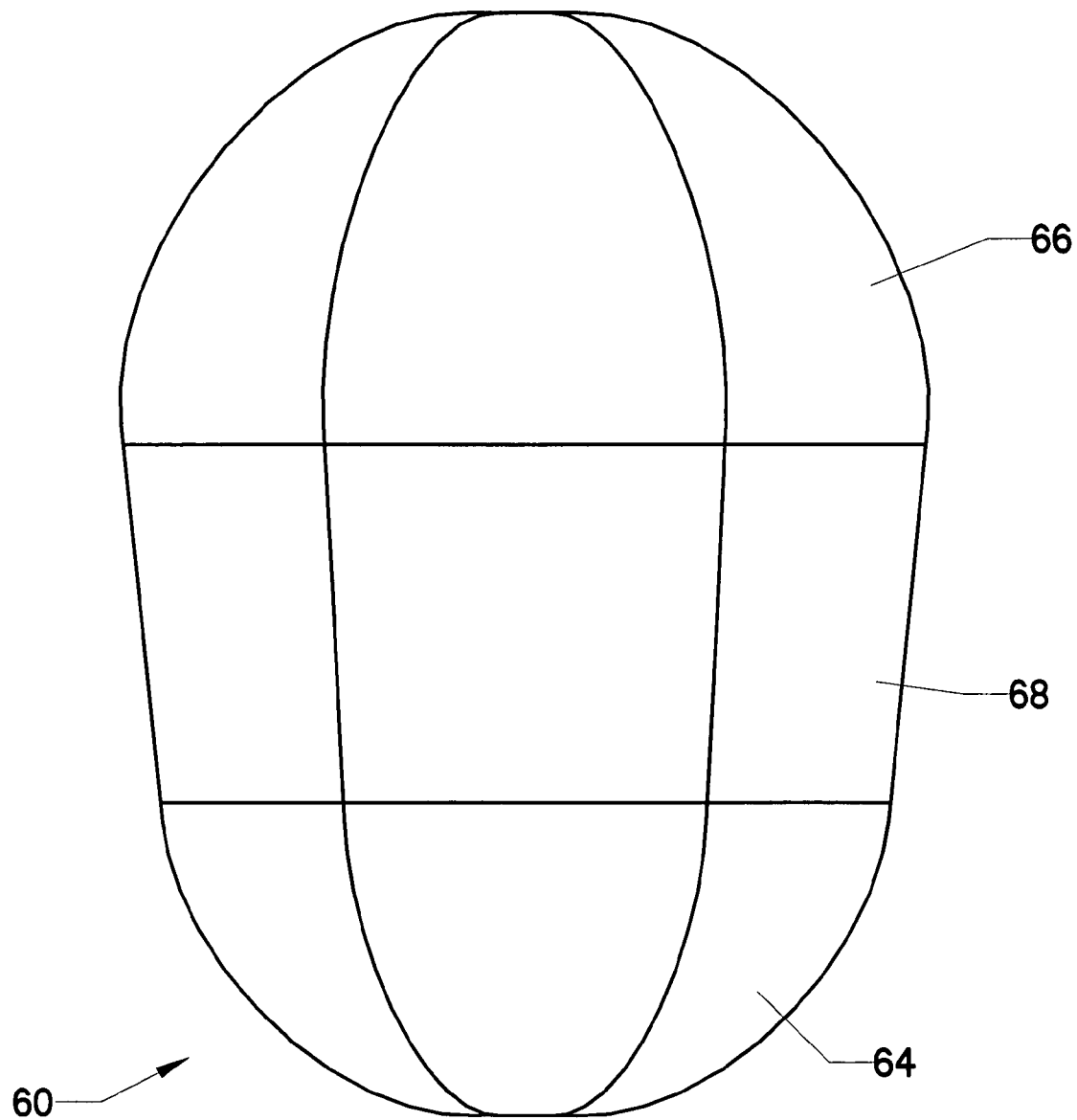
FIG. 24B is an elevation view, showing the cell of FIG. 23.

This particular embodiment of a hexagonal cell is intended to form with other adjacent identical cells to define a spherical surface. Thus, the geometry must be arranged such that these cells wrap around a spherical surface. In order to do this, the central hexagon must have tapered side walls. FIG. 24B shows hexagonal cell 60 in an elevation view.

The reader will observe how connecting members 68 taper inward proceeding from the outer convolution toward the inner convolution. Those skilled in the art will realize that if a plurality of such cells are linked together, a hollow sphere will be formed.

Figure 25:
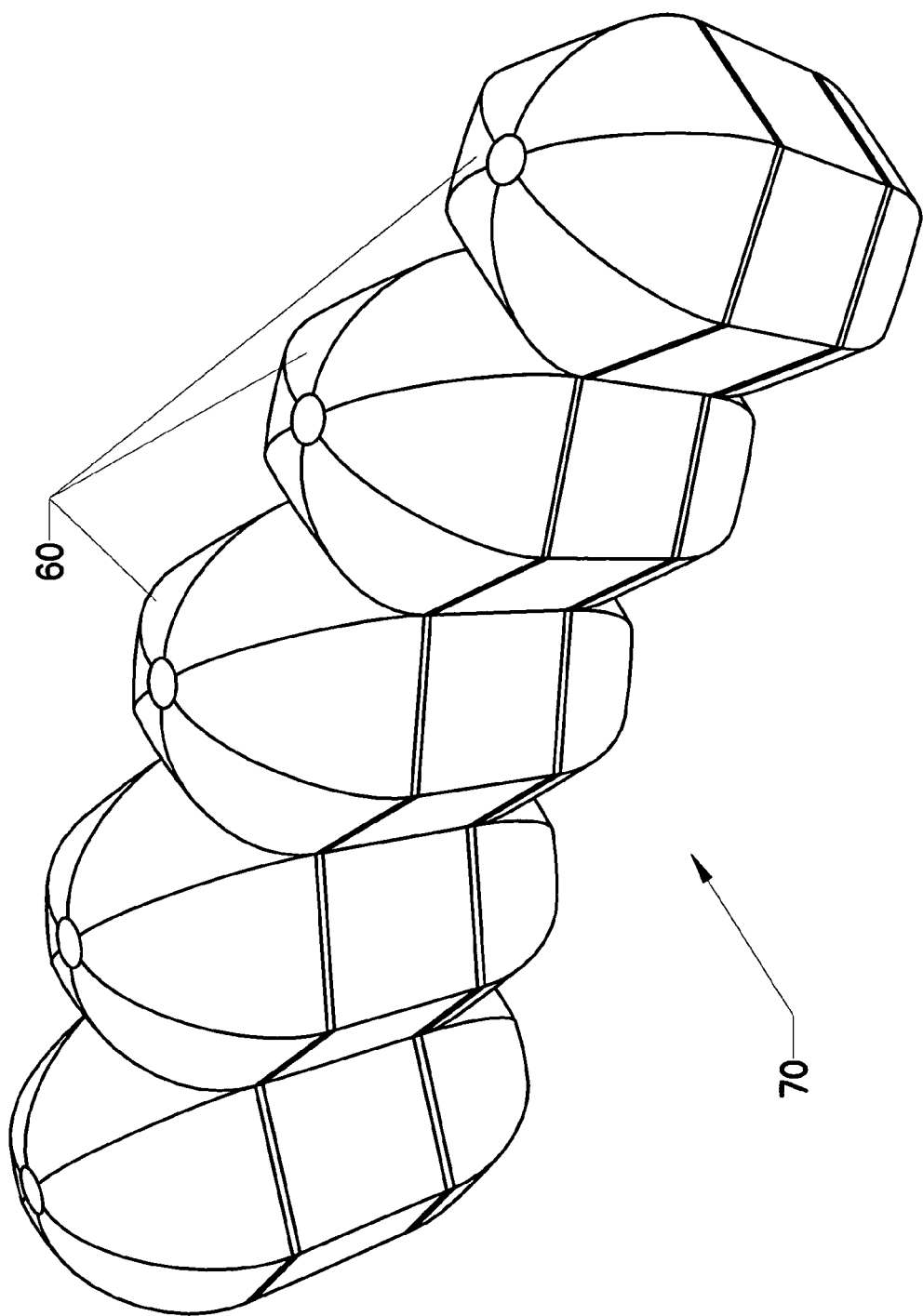
FIG. 25 is a perspective view, showing a row of hexagonal cells wrapped around a portion of a cylindrical surface.
Figure 26:
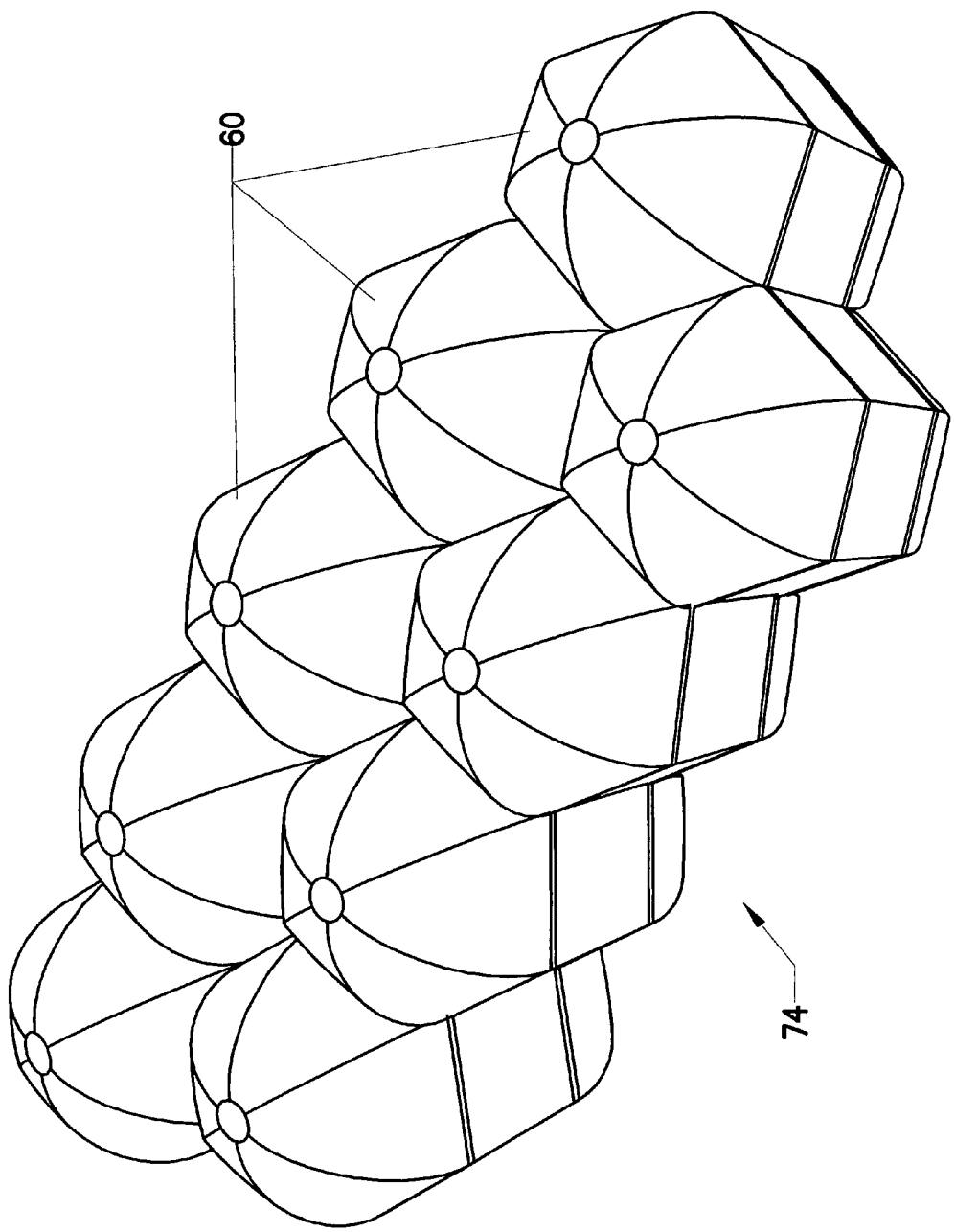
FIG. 26B is a perspective view, showing two rows of hexagonal cells wrapped around a portion of a spherical surface.

FIG. 25 shows the start of such a sphere. Five hexagonal cells have been joined to form radial array 70. Continuing to add cells to the radial array will eventually form a solid ring of such cells (assuming that appropriate dimensions are selected). Adding more cells to the front and the back of the radial array will then begin to form a sphere. FIG. 26 shows the addition of more such cells, with the spherical wall profile beginning to be visible.

Figure 25B:
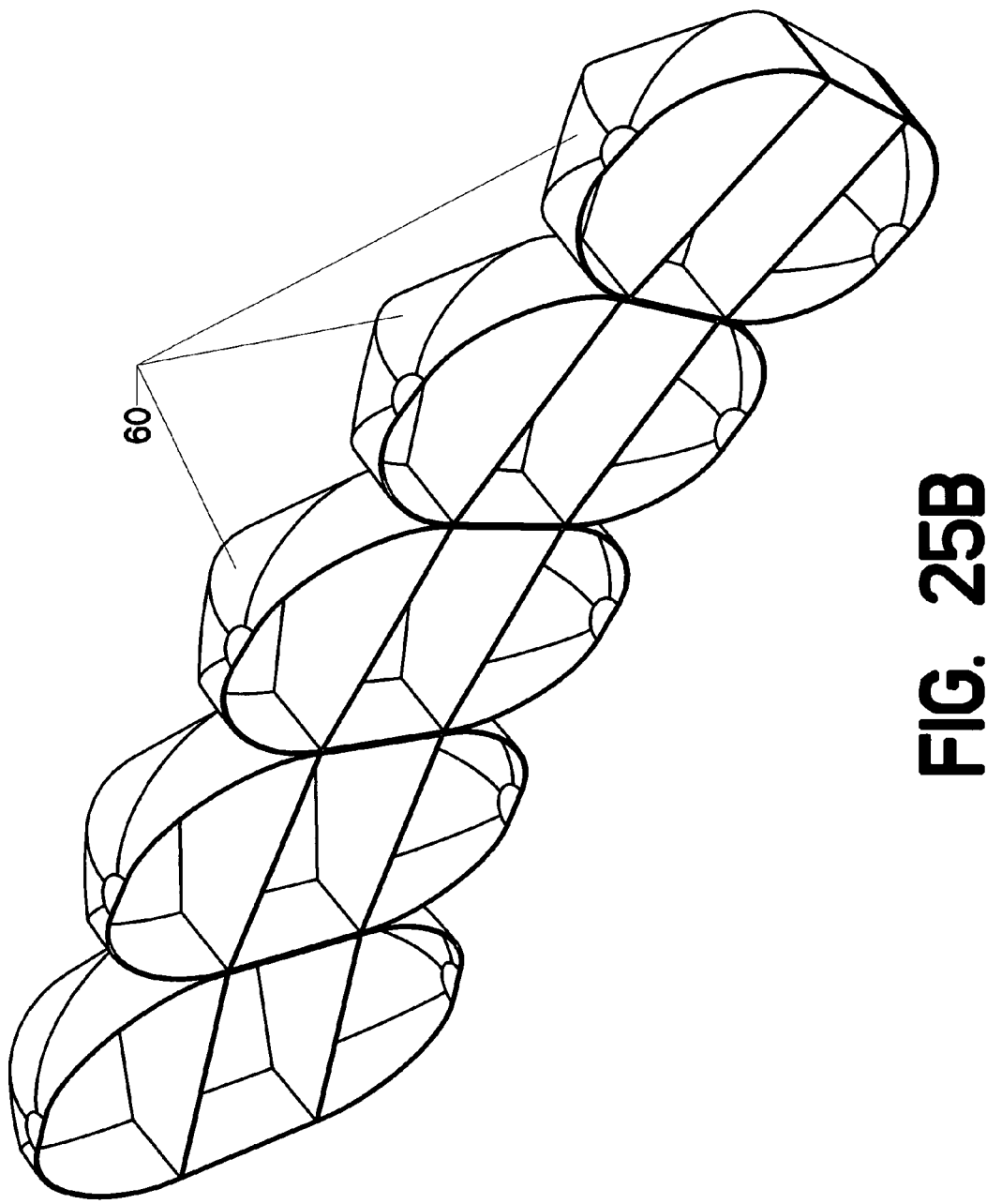
FIG. 25B is a section view, showing the row of hexagonal cells sectioned in half to show the relationships of the internal features.

FIG. 25B shows the radial array of FIG. 25 sectioned in half to show internal details. By comparing FIG. 25B to FIG. 1, the reader will note how the same basic structure is used to form the linear cells and the hexagonal cells. The five-layer structure can employ other geometries as well. While hexagonal cells are ideal for forming a spherical chamber, the connecting tensile members of the third layer can be formed into other polygons as well, such as triangles, squares, and rectangles (though a triangular cell does not necessarily need the two shear panels 62).

Many techniques could be employed to actually create the geometry shown in FIGS. 23-26. As an example, the cells need not be created as independent structures which are subsequently joined. A more mass-efficient structure would be created by having adjacent cells share common walls. The second, third, and fourth layers could be manufactured into a sphere, with the outer and inner convolutions being added last.

The reader should also note that the cells need not be made entirely of solid walls. Returning briefly to FIG. 3, the reader will recall that the pressure inside each of the cells should be close to equal. It was previously suggested that air passages might be provided between adjoining cells and through the second and fourth layers to ensure pressure equalization. Only the first and fifth layers need to maintain an airtight barrier. Thus, the second, third, and fourth layers need not be made of solid walls. They can be made of mesh material, a web of laced cables, or many other possible constructions. Any of these structures could serve as an appropriate "tensile member." A few examples will serve to illustrate these principles.

Figure 27:
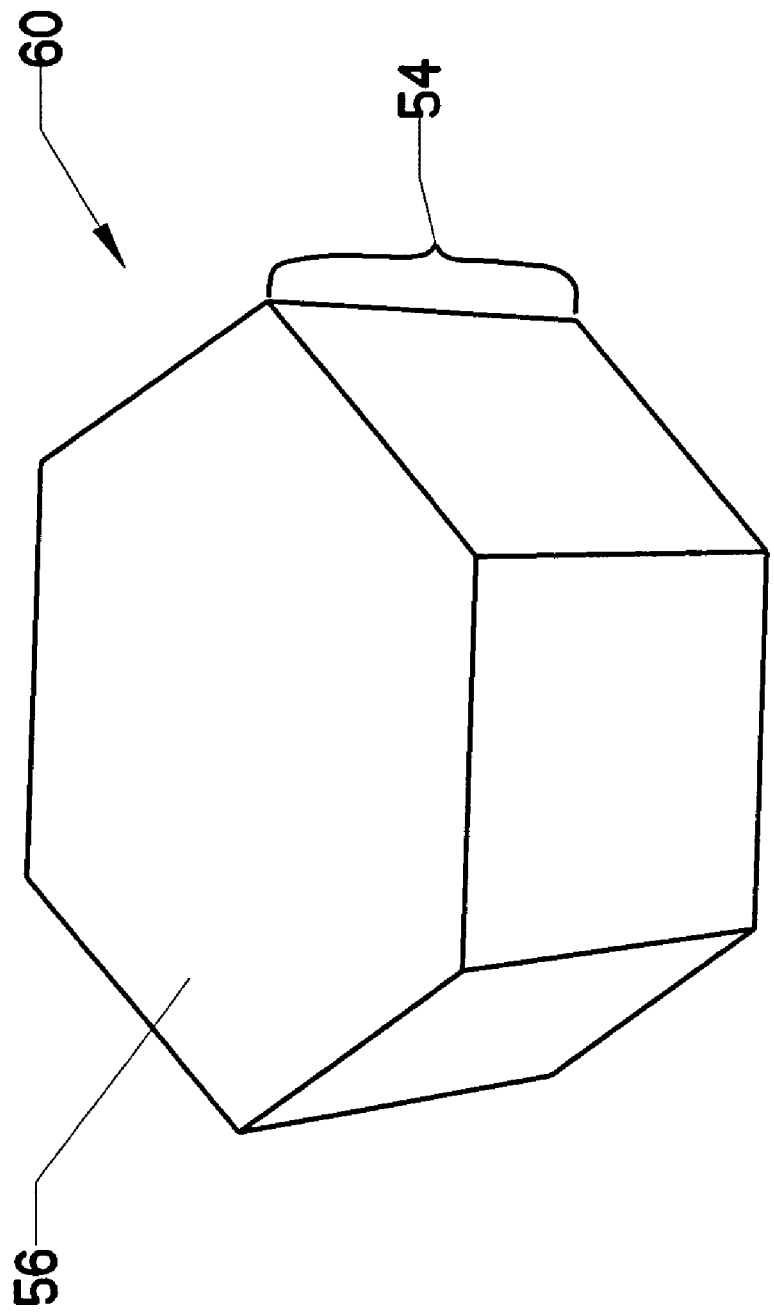
FIG. 27 is a perspective view, showing the second, third, and fourth layers of a hexagonal cell.
Figure 28:
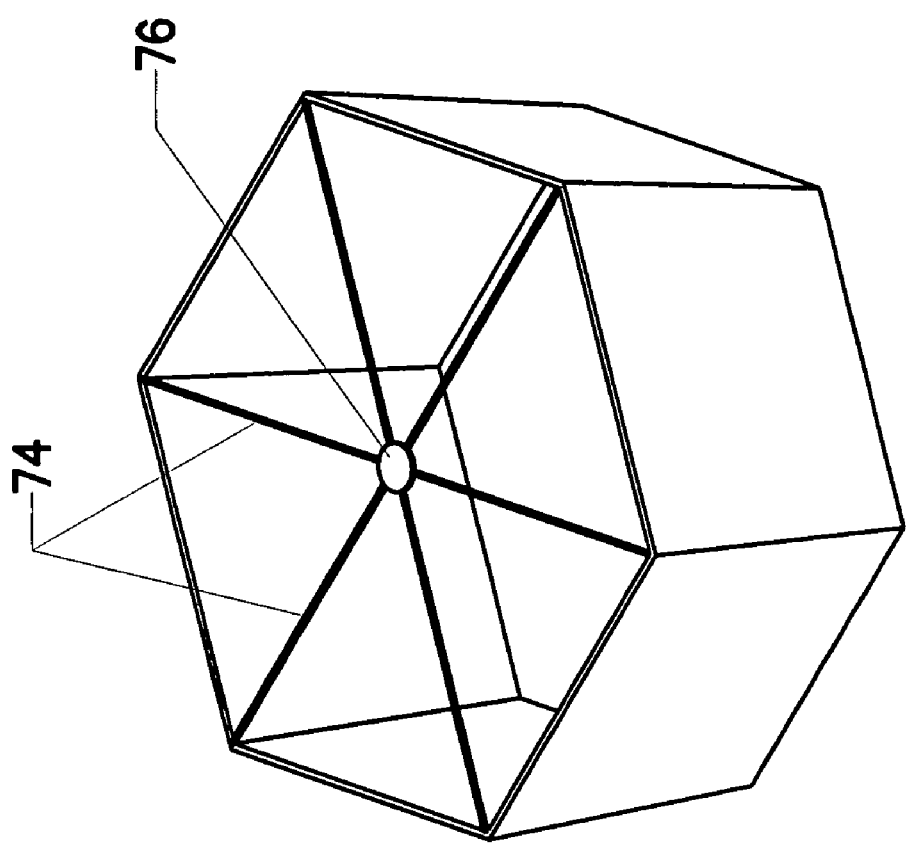
FIG. 28 is a perspective view, showing an alternate embodiment in which the solid panels in the second and fourth layers have been replaced by a web of cables.

FIG. 27 shows a portion of a hexagonal cell 60 (only the second, third, and fourth layers are shown). The first and fifth layers have been removed for visual clarity. Fourth layer 56 faces the viewer in FIG. 27. Fourth layer 56 is formed by a solid panel which closes the top of the hexagon formed by the six walls in third layer 54. FIG. 28 shows an alternate structure, in which a set of six cables 74 are linked to central junction 76. The cables are able to transmit the tensile loads carried by the solid panel in the embodiment of FIG. 27, and thereby serve as the tensile member for the fourth layer. Those skilled in the art will realize that the cables do not perform exactly the same as a solid panel, but they may be a useful alternative in some structures.

Figure 29:
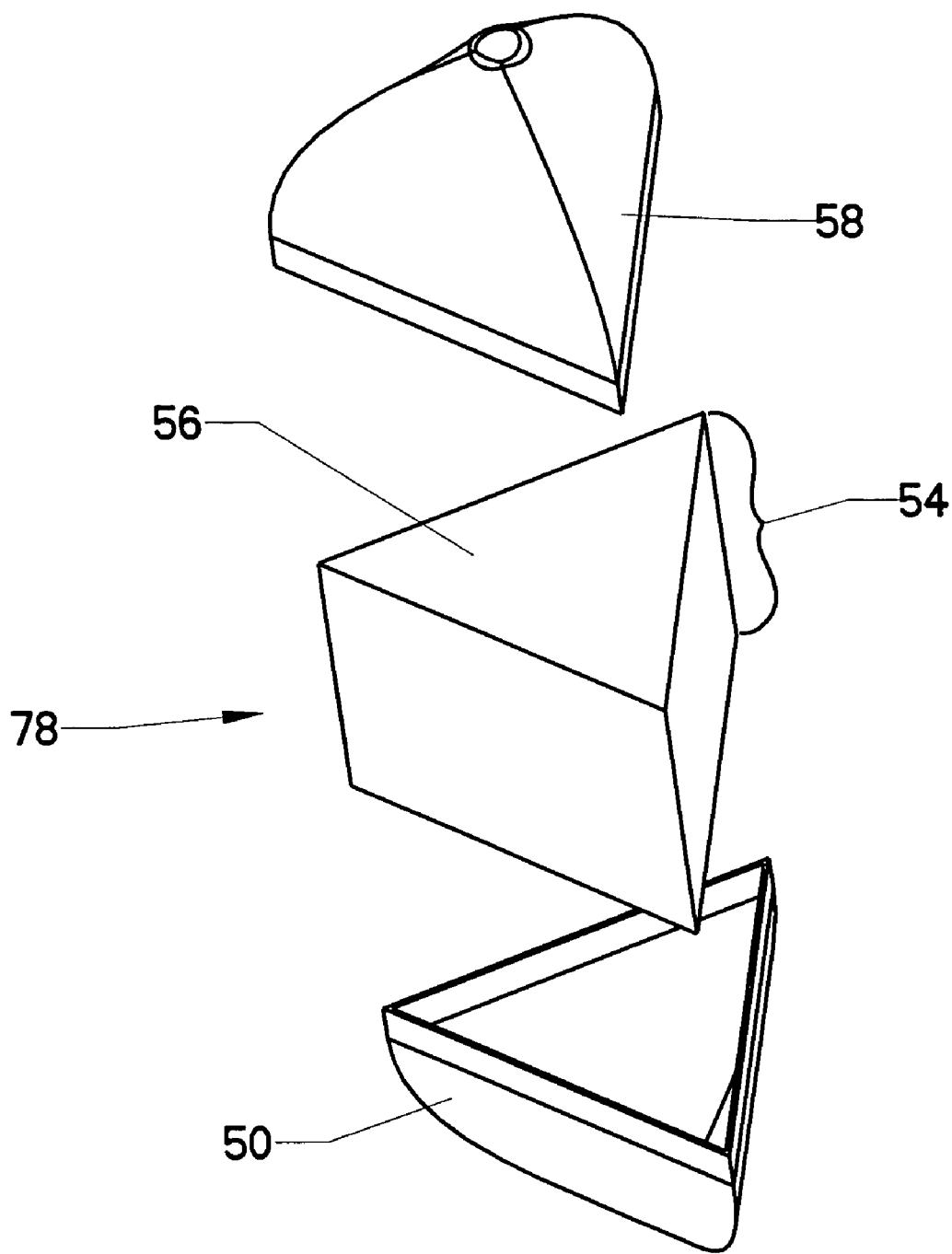
FIG. 29 is an exploded view, showing a triangular cell.
Figure 30:
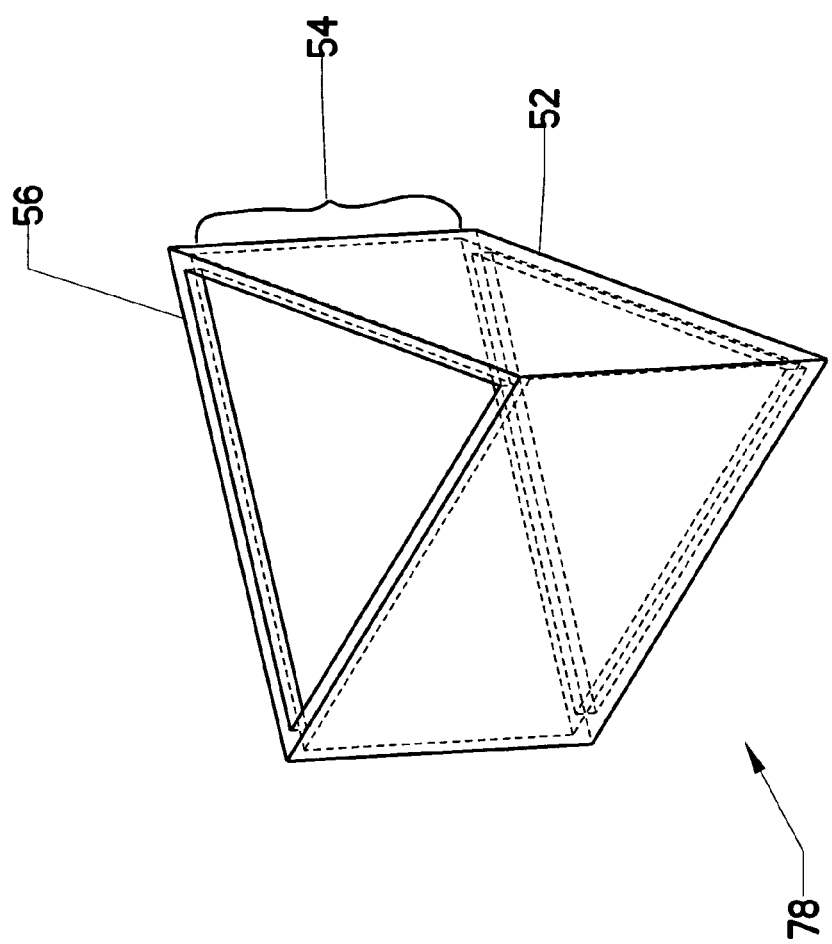
FIG. 30 is a perspective view, showing the second, third, and fourth layers of a triangular cell with the some of the solid panels being replaced by stiffening ribs.

FIGS. 29 and 30 shows the application of these principles to a triangular cell 78. Those skilled in the art will know that triangular cells can be used to "wrap" around many different types of surfaces, including spherical surfaces. The triangular cell is shown in exploded form. First layer 50 and fifth layer 58 have been separated from the second, third, and fourth layers for visual clarity. In this embodiment of a triangular cell, the second and fourth layers comprise solid panels which close the top and bottom of the triangular cavity formed by the three walls of the third layer. However, as for the embodiments of FIGS. 27 and 28, other things can be substituted for the solid panels.

FIG. 30 shows an embodiment in which the solid panels for the second and fourth layers have been replaced by a stiffened rib running around the cell's perimeter. This stiffened rib is able to carry the tensile loads previously carried by the solid panels (albeit in a different way). Other structures could also be used for the second and fourth layer.

APPLICATIONS

The lightweight structure thus disclosed has numerous possible applications. One obvious application is as a lighter substitute for conventional vacuum chambers in aerospace applications (such as vapor deposition chambers). Other applications include areas in which the substantial weight savings offered by the present design—which can exceed a factor of 30—create new possibilities.

A first example is the use of the structure in creating large cryogenic tanks for storage and transportation of liquified gasses. Dramatically reducing the weight of such chambers could make it possible to store large amounts of liquified gas—such as liquid hydrogen—in containers of minimal weight.

Another example would be in the construction of a "Solar Tower." This technology employs a very tall chimney to produce electrical power from sunlight. Air is heated by sunlight over a large area. This air is directed into the base of the chimney. It shoots up the chimney at considerable velocity, allowing it to drive air turbines. A station presently planned near Mildura, Australia has a 3,200 foot chimney and a 3.2 mile diameter collection area. The efficiency of this system is directly proportional to chimney height.

The present structure could be employed for the chimney, with contained volume 14 serving as the flue. The pressure within the contained volume would be only slightly less than the surrounding atmosphere. This represents an application which is not a vacuum chamber in the conventional sense. However, the present structure could allow the construction of a much higher chimney, since its stiffness to weight ratio is much higher than for conventional structures.

Another innovative application pertains to the field of space payload launching. Modern satellite launches cost approximately $10,000 per payload pound placed in low earth orbit. While some improvement may be possible, the limitations inherent in chemical propulsion will prevent any substantial reduction in this cost.

On the other hand, magnetic propulsion offers substantially increased efficiency. Magnetic propulsion involves the use of electrical energy to propel a vehicle along a magnetic "track." The vehicle is typically magnetically levitated as well as propelled. Such a system is capable of providing substantial energy to a vehicle. Unfortunately, such magnetic devices are large and heavy. They are therefore confined to the earth's surface.

Since such systems must run along the earth's surface, they operate in the densest portion of the atmosphere. The dense atmosphere prevents the magnetic acceleration of a vehicle to the velocity needed to orbit the earth. Aerodynamic forces prevent acceleration significantly beyond Mach 1 at low altitudes.

On the other hand, if a magnetic propulsion system can be contained within a very long vacuum chamber, the aerodynamic forces normally found at low altitude can be eliminated. The construction of a "vacuum tunnel" could meet this objective. The tunnel would travel several hundred miles across the surface of the earth. It would then curve gradually upward, reaching an incline of about 6 degrees as it extends up through the atmosphere. It would extend several hundred miles through the atmosphere, eventually terminating about 26 miles above the earth's surface.

The portion of the vacuum tunnel lying along the earth's surface might be a conventional wall design, since the weight would not be a major concern (although it could also be constructed according to the present invention). However, once the tunnel curves away from the surface, weight becomes critical. It is in this region that the present invention offers a tremendous advantage.

Figure 13:
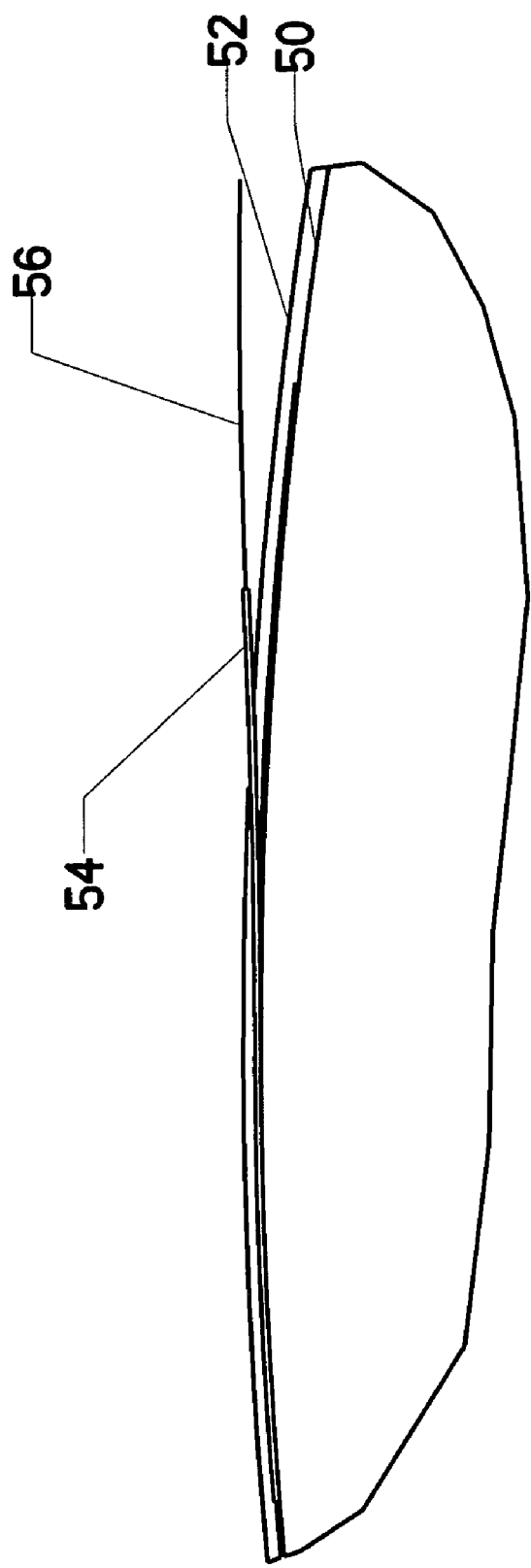
FIG. 13 is an elevation view, showing an application of the vacuum chamber.

FIG. 13 shows a vacuum tunnel 54, with its first portion lying along earth surface 50. It gradually curves up and through atmosphere 52. A payload will be accelerated inside the tunnel—along the earth's surface. It then proceeds through the upward curving portion of the vacuum tunnel. When the payload exits the vacuum tunnel, it is through most of the atmosphere. It then travels along trajectory 56.

In such a design, wind forces on the airborne portion of the tunnel are a significant concern. The tunnel would be configured in an easterly direction in order to align with the prevailing winds. However, means to stabilize against cross winds would have to be provided. It would be possible to tether the buoyant portion of the tunnel to the ground using a material of sufficiently high strength to density ratio (such as Kevlar).

The pressure required in the cells of the structure would vary with the altitude. A section of tunnel near the ground would need higher stabilization pressure than one higher up. Thus, transverse bulkheads will be needed in the cells. These could be provided every 1000 feet or so. The tethers could be attached at the location of these bulkheads as well. The tethers could be bundled into groups on their course to the ground, thereby reducing the number of ground attachment points and resulting wind load on the tethers.

There would thus be three main types of forces acting upon the portion of the vacuum tunnel which lies above the ground: The weight/buoyancy of the tunnel, the tension of the tethers, and the wind force. In order for the weight/buoyancy and tension forces to balance the wind forces without substantial displacement of the tunnel's location, the tunnel's diameter would need to be large. It might be as large as 200 feet in order to give sufficient buoyancy.

The tethers would need to travel to the ground at an angle (perhaps 45 degrees) in order to provide lateral stability. For greater positional stability, the deflection could be measured using an inertial or GPS system and the tension in the tethers could be adjusted (such as by using hydraulic actuators) in order to dampen any oscillations or displacement.

The pressurized gas within the cells has a substantial weight. Pressurized air may be too heavy to maintain buoyancy in some embodiments. Helium could be substituted. Diffusion rates through the chamber walls would be manageable, and if the structure must be deflated (perhaps to lower it to the ground for servicing), the helium could be recovered.

Additionally, because most of the pressurizing gas would be needed at low altitude, the diameter at low altitude could be reduced to reduce the total volume of pressurizing gas needed. Since the wind velocity is lower at low altitude, the reduction in diameter could be made without compromising stability. Similarly, it would be possible to increase the tunnel diameter at high altitude in order to provide increased stiffness against sustained winds (by increasing buoyancy to surface area ratio) and wind gusts (by increasing mass to surface area ratio). This could be done without significantly increasing the total gas requirement. By adjusting other parameters—such as climb angle and tether angle, it may be possible to further reduce the amount of gas required. As the tunnel climbs through the atmosphere, air pressure and air density considerations dictate that the cell wall thickness and the pressure of the pressurizing gas would decrease.

The wall material employed may be very thin. Assuming the entire length of the vacuum tunnel (terrestrial and airborne) is constructed of polyester film, required material weight would be on the order of 50 million pounds, at a present cost of about $250 million. If the structure is built using about 24 cells, the low altitude cell wall thickness we be about ⅛ inch.

In the horizontal acceleration section of the vacuum tunnel, propulsion of the payload would be provided by a magnetic levitation/propulsion system such as the Inductrack technology discussed in the IEEE's *Applied Superconductivity* publication, Vol. 10, No. 1, March 2000, p. 901-904. Such a levitation system employs permanent magnets on the vehicle and passive induction coils on the track. The weight of the magnets on the vehicle would likely comprise about ⅕ of its total weight. These could be shed, though, once the vehicle exits the acceleration phase.

In the first section of the tunnel, the vehicle would be rapidly accelerated for several minutes. It would preferably be accelerated beyond orbital velocity. Because of the velocity, the tunnel's curvature would be extremely limited (on the order of 1.5 feet per mile). Furthermore, the vacuum in the tunnel would need to be maintained around 0.01 torr by large volume pumps. A large number of evenly spaced pumps would be needed to ensure very low pressure and consequent low aerodynamic forces. In such a case, the initial pump-out could take as long as one month.

After reaching top speed, the payload would enter a second portion of the tunnel. This section would curve upward. In this second section, magnetic levitation circuits would remain but no propulsive circuits would be present. Because the magnetic levitation devices are quite heavy, this portion would need to travel along a rising portion of the earth's surface (such as up the side of a mountain range) in order to achieve a climb angle of around 5 degrees. This section would, in the course of about 60 miles, rise to an altitude of about 14,000 feet.

Finally, the payload would enter the third and last section of the tunnel (the buoyant airborne section). In this section there would be no more magnetic equipment. The payload would travel through this portion in a free fall trajectory. Corrective guidance would be needed to ensure no contact with the tunnel wall. The tunnel's internal diameter would need to be fairly large in this section, such as 100 feet or more. Collision avoidance could be provided by a reaction control system on the payload or by using the tethers to move the tunnel so that it coincides with the payload's projected flight path.

During the approximately 40 seconds that the capsule would be in this third portion of the tunnel, preparations must be made for its impact with the upper atmosphere upon exiting the tunnel. The payload will exit the tunnel about 26 miles above the earth's surface traveling at a velocity of about Mach 35.

Figure 14:
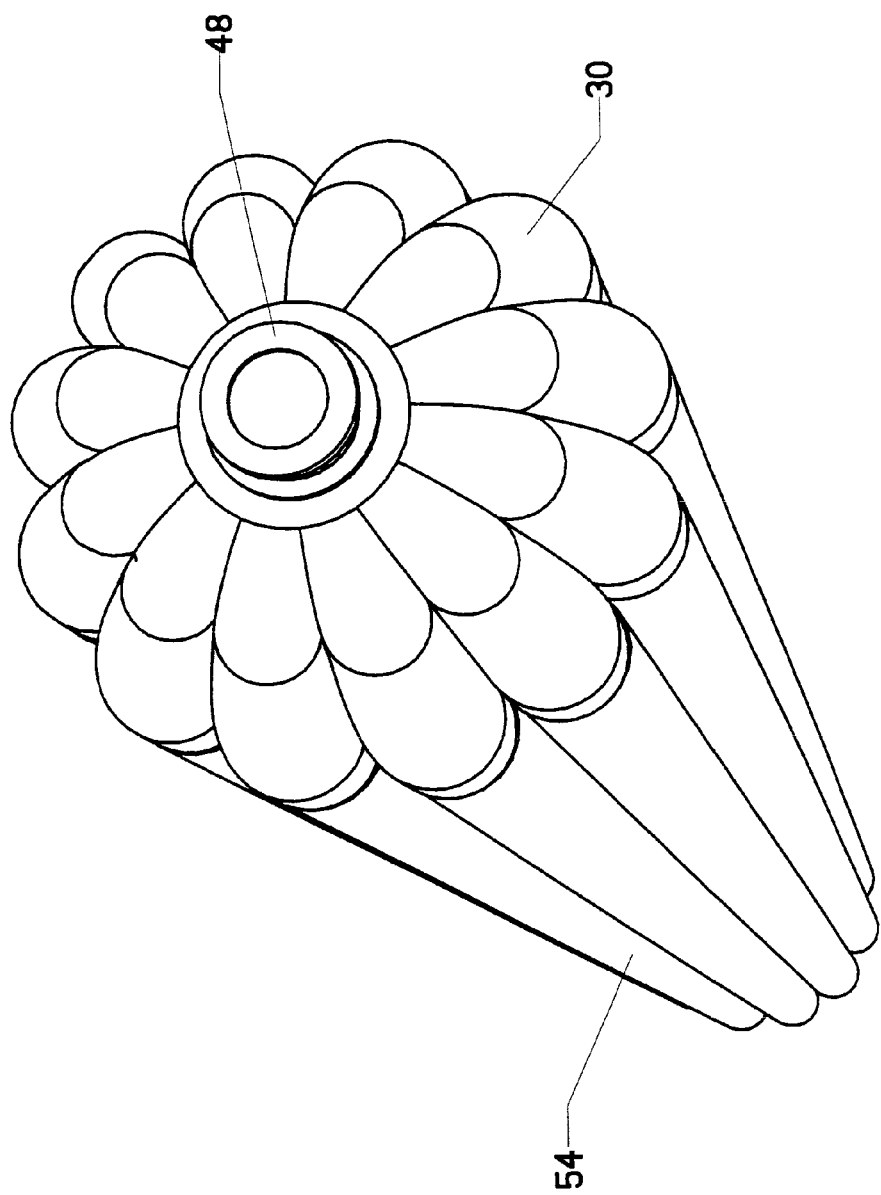
FIG. 14 is a perspective view, showing the use of an escape valve.

All external extensions (such as the magnetic levitation devices) would have to be retracted or discarded. FIG. 14 shows the last section of the vacuum tunnel, denoted as vacuum tunnel 54. An end cap 30 seals its upper end. This seal is needed because the atmospheric pressure at the 26 mile altitude is still higher than the 0.01 torr desired within the tunnel. Means must be provided to allow the payload to escape. A thin membrane could be provided, since only a very slight pressure must be resisted. The payload could pierce this membrane on its way out. The membrane would have to be rapidly replaced to prevent loss of internal vacuum.

Another approach is to provide an escape valve 48 on the end of the vacuum tunnel. This valve would open to allow the payload to pass, then close once the payload is clear. The escape valve must obviously be very fast acting, given the velocity of the approaching payload.

Upon exiting the vacuum tunnel, the payload would experience aerodynamic deceleration of approximately 2 g's and intense heating from air friction. However, since the payload would be gaining one mile of altitude every 1.4 seconds, this deceleration period is relatively short. The payload must be given enough velocity to pass through the deceleration period but still retain orbital velocity at the end.

Of course, the payload could be provided with conventional chemical propulsion as well. Once clear of the vacuum tunnel, a rocket motor could be ignited to maintain or increase the velocity. Conventional propulsion and maneuvering systems could be provided to permit changes in the resulting orbit (such as altitude, inclination, and circularization).

Though the vacuum tunnel would obviously be quite expensive to construct, the per launch cost would be drastically lower than existing vehicles. The launch cost could be reduced by several orders of magnitude.

The applications thus disclosed indicate the potential utility of the lightweight structure claimed herein. Those skilled in the art will know that the structure has many more mundane applications as well. It is useful anywhere a weight reduction in a vessel containing a negative pressure is needed.

The actual embodiments illustrated and described should be viewed as exemplary. There are many other possible embodiments using the structure disclosed. Thus, the scope of the invention should be fixed by the following claims, rather than any specific examples provided.

Having described my invention, I claim:

1. A structure for a negative pressure vessel, comprising:
   a. a wall, separating an internal volume contained within said negative pressure vessel from an external volume lying outside said negative pressure vessel;
   b. wherein said wall is formed from a plurality of joined cells;
   c. wherein each of said plurality of joined cells has a first layer, a second layer, a third layer, a fourth layer, and a fifth layer, with each of said layers being made of tensile elements;
   d. wherein said first, second, third, fourth, and fifth layers are radially disposed outwardly from a central axis running down the middle of said negative pressure vessel, with said first layer being closest to said central axis, said second layer being further from said central axis than said first layer, said third layer being further from said central axis than said second layer, said fourth layer being further from said central axis than said third layer, and said fifth layer being furthest from said central axis;
   e. said first, second, and third layers being joined at a plurality of inner junctions, wherein each of said inner junctions is equidistant from said central axis at a first radius;
   f. said third, fourth, and fifth layers being joined at a plurality of outer junctions, wherein each of said outer junctions is equidistant from said central axis at a second radius, said second radius being greater than said first radius;
   g. wherein each of said tensile elements in said first layer connects one of said inner junctions to an adjacent inner junction, said tensile elements in said first layer bulging inward toward said central axis;
   h. wherein each of said tensile elements in said second layer connects one of said inner junctions to an adjacent inner junction, said tensile elements in said second layer being straight;
   i. wherein each of said tensile elements in said third layer connects one of said inner junctions to an adjacent outer junction, said tensile elements in said third layer being straight;
   j. wherein each of said tensile elements in said fourth layer connects one of said outer junctions to an adjacent outer junction, said tensile elements in said fourth layer being straight; and
   j. wherein each of said tensile elements in said fifth layer connects one of said outer junctions to an adjacent outer junction, said tensile elements in said fifth layer bulging outward away from said central axis.

2. A structure as recited in claim 1, wherein:
   a. within said plurality of inner junctions, said tensile members of said first layer are approximately parallel to said tensile members of said third layer; and
   b. within said plurality of inner junctions, said tensile members of said second layer are approximately perpendicular to said tensile members of said third layer.

3. A structure as recited in claim 1, wherein:
   a. within said plurality of outer junctions, said tensile members of said fifth layer are approximately parallel to said tensile members of said third layer; and
   b. within said plurality of outer junctions, said tensile members of said fourth layer are approximately perpendicular to said tensile members of said third layer.

4. A structure as recited in claim 2, wherein:
   a. within said plurality of outer junctions, said tensile members of said fifth layer are approximately parallel to said tensile members of said third layer; and
   b. within said plurality of outer junctions, said tensile members of said fourth layer are approximately perpendicular to said tensile members of said third layer.

5. A structure as recited in claim 1, wherein:
   a. said tensile elements within said third layer form a plurality of joined polygons having inward facing openings and outward facing openings;
   b. said tensile elements within said second layer form panels which close said inward facing openings defined by each of said plurality of joined polygons; and
   c. said tensile elements within said fourth layer form panels which close said outward facing openings defined by each of said plurality of joined polygons.

6. A structure as recited in claim 5, wherein said polygons are hexagonal.

7. A structure as recited in claim 1, wherein said cells are linear.

8. A structure as recited in claim 1, wherein each of said cells is pressurized to a pressure greater than the pressure existing in said external volume.

9. A structure as recited in claim 2, wherein said cells are linear.

10. A structure as recited in claim 2, wherein each of said cells is pressurized to a pressure greater than the pressure existing in said external volume.

11. A structure as recited in claim 3, wherein said cells are linear.

12. A structure as recited in claim 3, wherein each of said cells is pressurized to a pressure greater than the pressure existing in said external volume.

13. A structure as recited in claim 4, wherein said cells are linear.

14. A structure as recited in claim 4, wherein each of said cells is pressurized to a pressure greater than the pressure existing in said external volume.

15. A structure as recited in claim 5, wherein said polygons are triangles.

16. A structure as recited in claim 1, wherein:
 a. said tensile elements within said third layer form a plurality of joined polygons having inward facing openings and outward facing openings;
 b. said tensile elements within said second layer are proximate to the inward facing openings defined by each of said plurality of joined polygons; and
 c. said tensile elements within said fourth layer are proximate to said outward facing openings defined by each of said plurality of joined polygons.

17. A structure as recited in claim 16, wherein said polygons are hexagonal.

18. A structure as recited in claim 16, wherein said polygons are triangles.

* * * * *